United States Patent
Mongeau

(10) Patent No.: US 9,548,153 B2
(45) Date of Patent: Jan. 17, 2017

(54) METHODS FOR MAGNETIZING AND DEMAGNETIZING MAGNETIC POLES IN AN ELECTRICAL MACHINE

(75) Inventor: Peter Mongeau, Westborough, MA (US)

(73) Assignee: Vestas Wind Systems A/S, Aarhus N. (DK)

( * ) Notice: Subject to any disclaimer, the term of this patent is extended or adjusted under 35 U.S.C. 154(b) by 882 days.

(21) Appl. No.: 13/807,541

(22) PCT Filed: Jun. 24, 2011

(86) PCT No.: PCT/DK2011/050234
§ 371 (c)(1),
(2), (4) Date: Mar. 18, 2013

(87) PCT Pub. No.: WO2012/000503
PCT Pub. Date: Jan. 5, 2012

(65) Prior Publication Data
US 2013/0169392 A1    Jul. 4, 2013

Related U.S. Application Data

(60) Provisional application No. 61/360,107, filed on Jun. 30, 2010.

(30) Foreign Application Priority Data

Aug. 12, 2010   (DK) .................................. 201070355
Aug. 12, 2010   (DK) .................................. 201070356

(51) Int. Cl.
*H01F 13/00*   (2006.01)
*H02K 15/03*   (2006.01)
(Continued)

(52) U.S. Cl.
CPC ............ *H01F 13/003* (2013.01); *H02K 15/03* (2013.01); *H02K 7/1838* (2013.01);
(Continued)

(58) Field of Classification Search
CPC ..... H01F 13/003; H02K 15/03; H02K 7/1838; H02K 15/0006; H02K 2213/12; Y02E 10/725
See application file for complete search history.

(56) References Cited

U.S. PATENT DOCUMENTS 3,869,627 A * 3/1975 Ingenito ................. G04C 15/00
                                                                    310/156.32
4,748,535 A * 5/1988 Arawaka ............... H01F 13/003
                                                                    335/284
(Continued)

FOREIGN PATENT DOCUMENTS

JP    2000-012331 A    1/2000
JP    2004-242378 A    8/2004

OTHER PUBLICATIONS

International Search Report, PCT/DK2011/050234, Jan. 17, 2013, 16 pages.
(Continued)

*Primary Examiner* — Mohamad Musleh
(74) *Attorney, Agent, or Firm* — Patterson + Sheridan LLP

(57) ABSTRACT

Apparatus and methods to magnetize and demagnetize the magnetic poles of a rotor assembly for an electrical machine, such as a generator. The apparatus and methods provide for individually magnetize magnetic domains in the permanent magnetic material of the magnetic poles of a rotor assembly of the electrical machine after the electrical machine is installed in a larger assembly. The magnetization system may be used to magnetize and demagnetize the magnetic (Continued)

poles while the rotor assembly is connected with a prime mover, such a rotor of a wind turbine.

12 Claims, 12 Drawing Sheets

(51) Int. Cl.
*H02K 7/18* (2006.01)
*H02K 15/00* (2006.01)

(52) U.S. Cl.
CPC ..... *H02K 15/0006* (2013.01); *H02K 2213/12* (2013.01); *Y02E 10/725* (2013.01)

(56) References Cited

U.S. PATENT DOCUMENTS

| | | | |
|---|---|---|---|
| 2010/0011567 A1 | 1/2010 | Helle et al. | |
| 2011/0018484 A1* | 1/2011 | Fullerton | G09F 7/04 318/696 |
| 2011/0221552 A1* | 9/2011 | Rochford | H01F 13/003 335/216 |

OTHER PUBLICATIONS

European Examination Report, Application No. EP 11 738 592.2, Jan. 22, 2014, 6 pages.

* cited by examiner

METHODS FOR MAGNETIZING AND DEMAGNETIZING MAGNETIC POLES IN AN ELECTRICAL MACHINE

BACKGROUND

This application relates generally to electrical machines and, more specifically, to apparatus and methods for magnetizing and demagnetizing the permanent magnets used in the rotor assemblies of electrical machines, such as permanent magnets found in the rotor assemblies of wind turbine generators.

Wind turbines can be used to produce electrical energy without the necessity of fossil fuels and can be aggregated in onshore and offshore wind farms connected to the electric power transmission network. Generally, a wind turbine is a rotating machine that converts the kinetic energy of the wind into mechanical energy and, when used for power generation, converts the mechanical energy into electrical power. A conventional horizontal-axis wind turbine includes a tower, a nacelle located at the apex of the tower, and a rotor that is supported in the nacelle by means of a shaft. The shaft couples the rotor either directly or indirectly with a rotor assembly of a generator housed inside the nacelle.

Wind turbine generators and their rotor assemblies can have relatively large diameters of up to ten meters. The primary component of the generator weight is the numerous permanent magnets that constitute the magnetic poles of the generator rotor assembly. In particular, the permanent magnets can weigh on the order of two to five metric tones. Installation of the permanent magnets into the rotor assembly of the generator is challenging, particularly as the size of the generator scales upwardly. The permanent magnets are composed of a material that generates a high-Gauss magnetic field when magnetized and, therefore, a material that is capable of generating strong repulsive or attractive forces with surrounding structures.

Conventionally, the magnetic poles used in the rotor assembly of a wind turbine generator are magnetized before it is installed in the nacelle. One conventional option is to magnetize the permanent magnets, install them into the rotor assembly of the generator, and then install the rotor assembly holding the magnetized permanent magnets into the generator. This assembly option requires use of one mechanical fixture to install the magnetized permanent magnets into the rotor assembly and another mechanical fixture to place the rotor assembly holding the magnetized magnets into the generator housing. A variation on this conventional option is to assemble the wind turbine generator sans permanent magnets and then to use a mechanical fixture to load magnetized permanent magnets into slots defined in the rotor assembly. For either of these conventional assembly options, the strong magnetic fields generated by the permanent magnets interact with surrounding structures, such as nearby ferromagnetic structures of the generator and even other permanent magnets previously installed in the rotor assembly. For example, the stator assembly of the generator may be difficult or impossible to remove because of the forces generated by the magnetized permanent magnets.

Another problem arises during maintenance or service of the generator while located in the nacelle. Generally, generator maintenance may be required, for example, as a result of a lightning strike or a short circuit. Once the permanent magnets are magnetized, the rotor assembly and stator assembly are difficult to remove from the generator because the strong magnetic fields. The difficulty is amplified if a gear box is absent and the rotor assembly of the generator is directly driven by the rotation of the rotor. In this instance, the generator cannot be simply decoupled from a gear box and replaced. The permanent magnets are also practically impossible to demagnetize while positioned within the wind turbine generator.

Improved apparatus and methods are needed to facilitate the installation of an electrical machine, such as a wind turbine generator, as well as improved apparatus and methods for servicing the electrical machine.

BRIEF SUMMARY

In an embodiment of the invention, a method is provided for installing an electrical machine. The electrical machine includes a stator assembly and a rotor assembly with a plurality of magnetic poles composed of a permanent magnetic material that is in a non-magnetized condition. The method includes, after the electrical machine is installed, individually magnetizing a plurality of magnetic domains in the permanent magnetic material of each of the plurality of magnetic poles. The magnetization may be performed while the electrical machine is coupled with the prime mover at the installation location.

In another embodiment of the invention, a method is provided for servicing an electrical machine. The electrical machine includes a rotor assembly with a plurality of magnetic poles composed of a permanent magnetic material magnetized with a first polarization vector and a first field strength. The method comprises magnetizing the permanent magnetic material in each of the plurality of magnetic poles to form a plurality of magnetic domains with a second polarization vector having a different direction than the first polarization vector or a second field strength smaller than the first field strength such that the magnetic poles are effectively demagnetized when performing the service. The magnetization may be performed in the installation and, in particular, while the electrical machine is coupled with the prime mover at the installation location.

In yet another embodiment, an apparatus includes a stator assembly, a rotor assembly with a magnetic pole composed of a permanent magnetic material, and a first magnetizing fixture configured to generate an external magnetic field for magnetizing the permanent magnetic material in the magnetic pole. The apparatus further includes a positioner configured to position the first magnetizing fixture at a plurality of positions relative to the magnetic pole.

In a specific embodiment, the apparatus may be a generator this is a component of a wind turbine that further includes a tower, a nacelle supported by the tower, and a rotor supported by the nacelle. The rotor is operatively coupled with the rotor assembly of the generator.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Generally, the embodiments of the invention are directed to add or to make use of a magnetizing means in the design of an electrical machine, such as a generator, in such a way that one or more of the magnets of a permanent magnet machine are in magnetizing field generated by the magnetization means, while the entire machine is in its normal assembled state, or in a state where it is manipulated to be ready for automatic magnetization. The presence of magnetizing means in the design of the machine allows for a number of time triggered or event driven controlled changes of magnetization state of the permanent magnets while inside the machine. The rotor assembly holding the magnets in turn (or all at once) may be aligned with the magnetizing field of the magnetization means to be ready for a magnetization, re-magnetization, or demagnetizing. The alignment may be provided by controlling the electrical machine itself or by an external means.

The apparatus and methods of the embodiments of the invention provide for individually magnetize magnetic domains in the permanent magnetic material of a magnetic pole after the electrical machine is installed in a larger assembly. The magnetization system may be used to magnetize and demagnetize the magnetic poles while the rotor assembly of the electrical machine is connected with a prime mover, such a rotor of a wind turbine.

Figure 1:
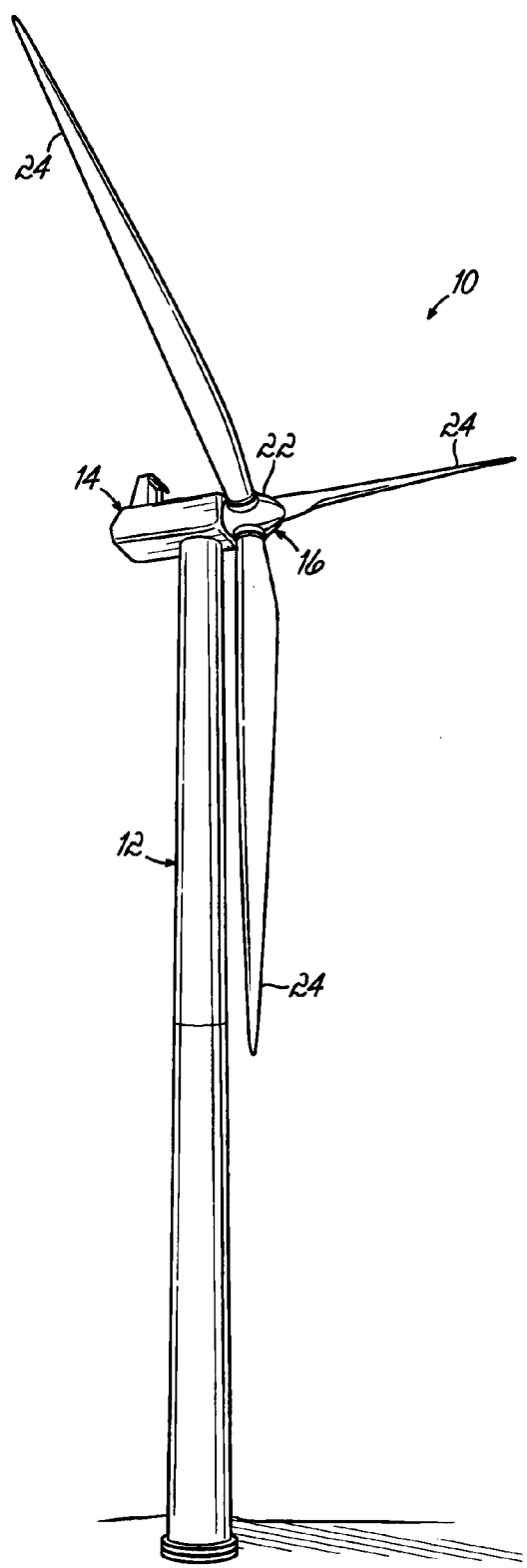
FIG. 1 is a perspective view of a wind turbine that includes a generator in accordance with embodiments of the invention.
Figure 2:
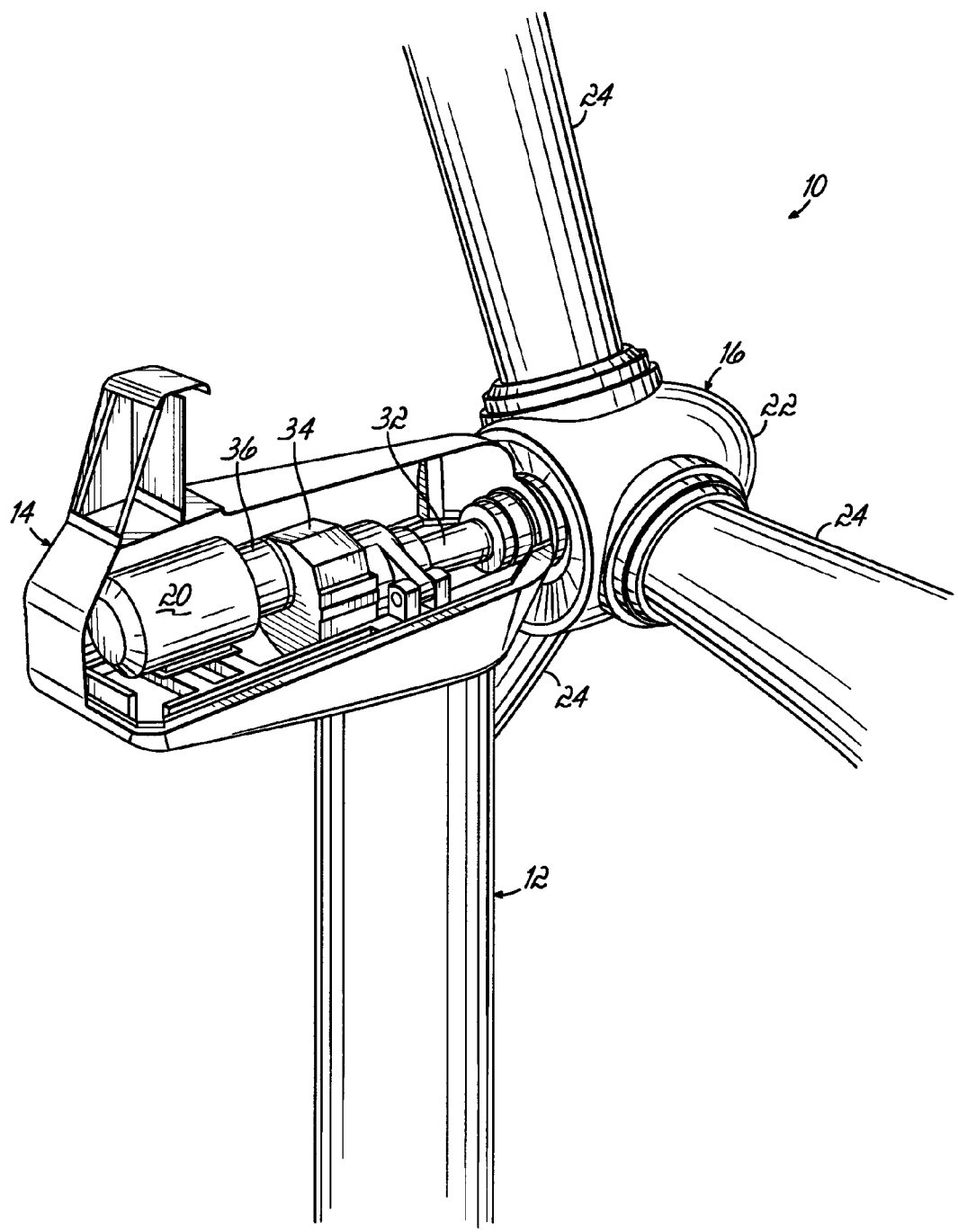
FIG. 2 is a perspective view of a portion of the wind turbine of FIG. 1 in which the nacelle is partially broken away to reveal structures, including the generator, inside the nacelle.

With reference to FIGS. 1 and 2 and in accordance with an embodiment of the invention, a wind turbine 10 includes a tower 12, a nacelle 14 at the apex of the tower 12, and a rotor 16 operatively coupled to a generator 20 housed inside the nacelle 14. The wind turbine 10, which is represented as a horizontal-axis wind turbine, has the ability to convert the kinetic energy of the wind into electrical energy. In addition to the generator 20, nacelle 14 houses various components needed to convert the wind energy into electrical energy and also various components needed to operate and optimize the performance of the wind turbine 10. The tower 12 supports the load presented by the nacelle 14, rotor 16, and other wind turbine components housed inside the nacelle 14. The tower 12 of the wind turbine 10 operates to elevate the nacelle 14 and rotor 16 to a height above ground level or sea level, as may be the case, at which wind with faster moving air characterized by smoother and less turbulent air currents is typically found.

The rotor 16 includes a central hub 22 and a plurality of blades 24 attached to the central hub 22 at locations distributed about the circumference of the central hub 22. In the representative embodiment, the rotor 16 includes three blades 24. The blades 24, which project radially outward from the central hub 22, are configured to interact with the passing air flow to produce lift that causes the central hub 22 to spin about its longitudinal axis. The design and construction of the blades 24 are familiar to a person having ordinary skill in the art. For example, each of the blades 24 is connected to the central hub 22 through a pitch mechanism that allows the blade to pitch under control of a pitch controller.

Wind exceeding a minimum level will activate the rotor 16 and allow it to rotate in a substantially perpendicular direction to the wind. The rotation movement is converted to electric power by the generator 20 and is usually supplied to the utility grid as known to a person having ordinary skill in the art.

Figure 3:
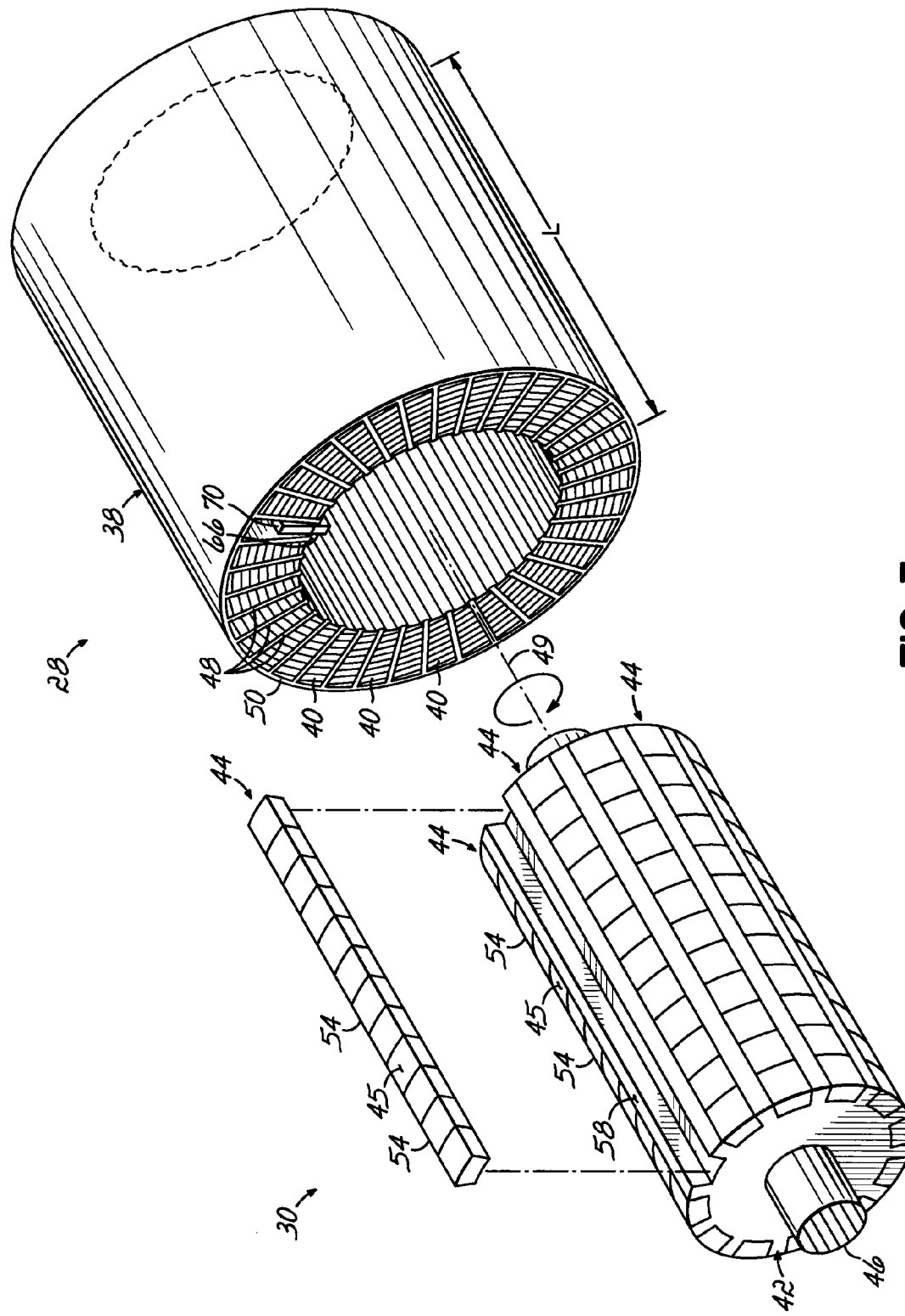
FIG. 3 is an exploded perspective view of the rotor and stator assemblies of the generator, as well as a portion of a magnetization system in accordance with an embodiment of the invention.
Figure 4:
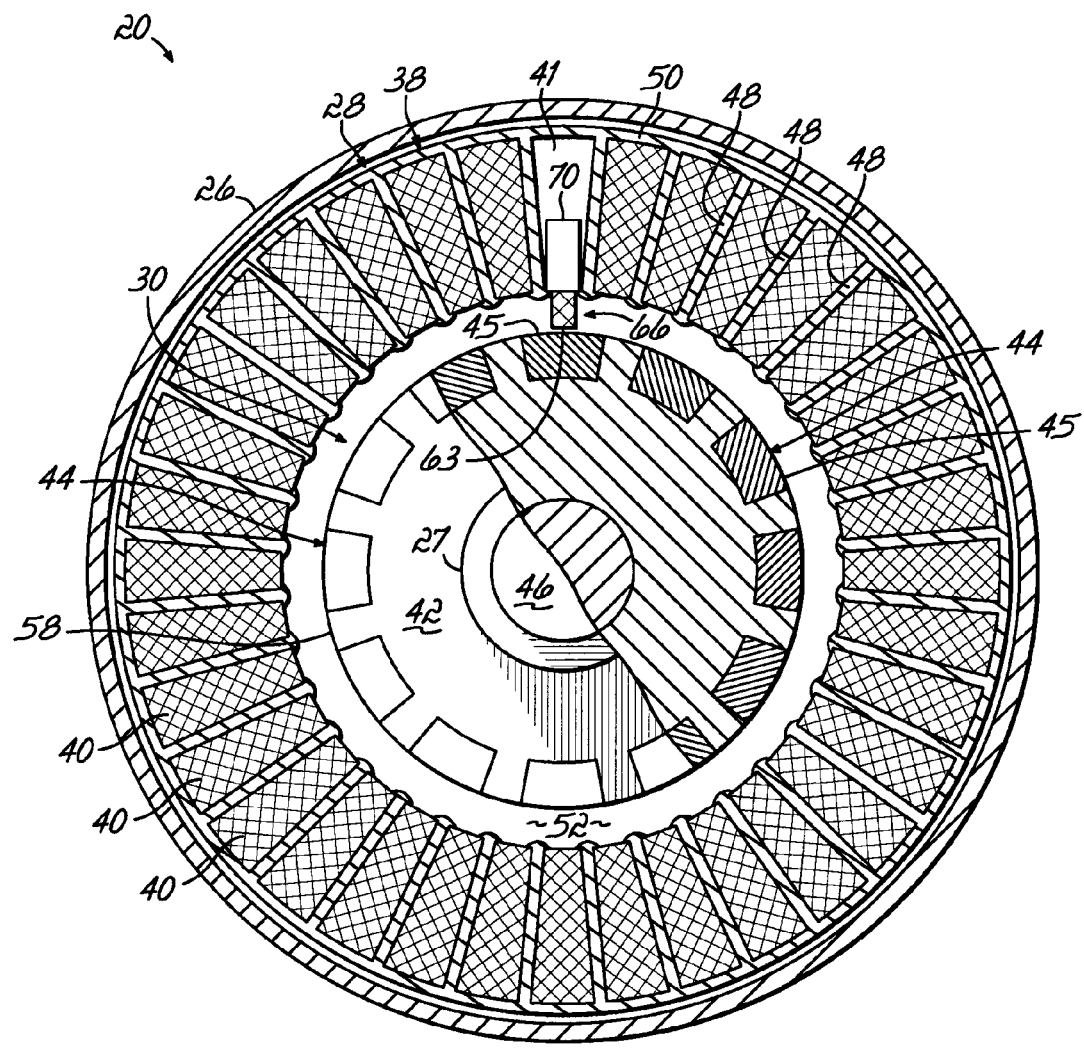
FIG. 4 is a cross-sectional view showing the generator and the magnetizing fixture of the magnetization system.

With reference to FIGS. 2-4 and in accordance with an embodiment of the invention, the generator 20 includes a hollow casing 26 consisting of a plurality of shell portions that, when assembled, enclose a space. The generator 20 includes a stator assembly 28 and a rotor assembly 30 that are housed with a radial-flux machine configuration inside the hollow casing 26. The stator assembly 28 and rotor assembly 30 have a concentric arrangement, the stator assembly 28 is fixed and stationary, and the rotor assembly 30 is configured to rotate relative to the stator assembly 28. A drive shaft 32 extends away from the central hub 22 of the rotor 16 into the nacelle 14 and has a rigid mechanical connection with the central hub 22 of the rotor 16. The drive shaft 32 is mechanically connected by a gearbox 34 with the rotor assembly 30 of the generator 20 through a mechanical coupling 36.

The gearbox 34 relies on gear ratios in a drive train to provide speed and torque conversions from the rotation of the rotor 16 to the rotor assembly 30 of the generator 20. Alternatively, the drive shaft 32 may directly connect the central hub 22 of the rotor 16 with the rotor assembly 30 of the generator 20 so that rotation of the central hub 22 directly drives the rotor assembly 30. In the representative embodiment, the rotor 16 operates as the prime mover of the rotor assembly 30 of the generator 20.

Although the generator 20 is depicted as incorporating one stator assembly 28 and one rotor assembly 30 with a concentric arrangement, the embodiments of the invention are not so limited. For example, the generator 20 may be modified to incorporate multiple rotor assemblies, each similar to rotor assembly 30, and/or multiple stator assemblies, each similar to stator assembly 28. In another alternative embodiment, the construction of the generator 20 may be altered such that the stator assembly 28 is disposed radially inside the rotor assembly 30.

The stator assembly 28 includes a stator frame 38 with an annular outer yoke 50, a plurality of teeth 48 projecting radially inward from the outer yoke 50 toward the rotor assembly 30, and a plurality of coils 40 disposed within the slots between adjacent teeth 48. The teeth 48 and slots extend along the full length, L, of the stator frame 38. As described above, the stator assembly 28 remains stationary during the operation of the generator 20 and represents the non-rotating part of the generator structure. The teeth 48 and outer yoke 50 may be composed of a ferromagnetic material, and the coils 40 include loops or turns of a conductive material that are electrically insulating from each other.

The rotor assembly 30 includes a rotor core or frame 42, a plurality of magnetic poles 44 circumferentially distributed about the rotor frame 42, and a drive shaft 46 mechanically connecting the rotor frame 42 with the mechanical coupling 36 of the gearbox 34 and thereby with the drive shaft 32 driven by the rotor 16. The drive shaft 46 is supported within the hollow casing 26 on bearings 27 that promote low-friction, free rotation of the rotor assembly 30 about a longitudinal axis 49 of the rotor assembly 30 and is rigidly connected with the rotor frame 42. The rotor assembly 30, which is generally cylindrical in shape, supports the magnetic poles 44 such that a radial air gap 52 is defined between the magnetic poles 44 and the distal ends of the teeth 48 of stator assembly 28. When the wind turbine 10 is operating, the rotor assembly 30 rotates or spins about the longitudinal axis 49 relative to the stationary stator assembly 28.

The stator assembly 28 and rotor assembly 30 of the generator 20 cooperate to convert the mechanical energy received from the rotor 16 into electrical energy so that the kinetic energy of the wind is harnessed for power generation. Specifically, the motion of the magnetic poles 44 of the rotor assembly 30 past the stationary coils 40 of the stator assembly 28 induces an electrical current in each of the coils 40 according to the precepts of Faraday's Law. In the embodiment that includes the gearbox 34, the generator speed may be in a representative range of 15 revolutions per minute (rpm) to 3000 rpm. In an embodiment for which the generator 20 is directly driven, the generator speed may be in a representative range of 5 rpm to 25 rpm.

Each of the magnetic poles 44 includes one or more permanent magnets 54 that are each composed of a permanent magnetic material susceptible to being permanently magnetized by a strong magnetic field and, once magnetized, capable of generating a high electromagnetic field. When the permanent magnetic material is produced, atomic groups in small volumes are mutually aligned with a shared polarization direction known as magnetic domains in to produce magnetic moments. In a non-magnetized condition, the various domains of the permanent magnetic material in each permanent magnet 54 are organized with different alignments such that, on a larger scale, the magnetic moments effectively cancel each other resulting in no net magnetic field or a weak overall magnetic field. All domains tend to align with an external magnetic field in order to magnetize the magnetic material. Some domains align more easily than others so the resulting magnetic field of the magnetized permanent magnet 54 is dependent upon the strength of the applied external magnetic field.

In one embodiment, each permanent magnet 54 is a rare-earth magnet containing a permanent magnetic material composed of an alloy containing one or more rare earth (lanthanide) elements, such as neodymium or samarium, that are ferromagnetic metals. Certain alloys containing rare earth elements and transition metals, such as iron, nickel, or cobalt, have a Curie temperature far above room temperature, which is a desirable property for the permanent magnets 54. Representative alloys suitable for the permanent magnetic material of permanent magnets 54 include, but are not limited to, a samarium alloy containing cobalt ($SmCo_5$) and a neodymium alloy containing iron and boron ($Nd_2Fe_{14}B$). A plating layer or coating may be applied to protect the permanent magnets 54 against corrosion, breakage, and chipping. Rare earth alloys are characterized by a crystalline structure of large magnetic anisotropy that promotes magnetization in one particular direction by a strong magnetic field but, once magnetized, is resistant to being magnetized in any different direction. The permanent magnetization may be altered by intentionally applying a magnetic field that is intended to demagnetize the permanent magnetic material. The generator 20 may include a cooling system (not shown) that prevents the temperature of the permanent magnets 54 from exceeding the Curie temperature of the constituent permanent magnetic material.

In the representative embodiment, each magnetic pole 44 includes multiple individual permanent magnets 54 that are adhesive bonded to an outer surface 58 of the rotor frame 42 or joined thereto using mechanical clips, frames, or other conventional mechanical fastening techniques to form each magnetic pole 44. Alternatively, instead of multiple magnets 54, each of the magnetic poles 44 may be constituted by a single, unitary permanent magnet 54 of a monolithic construction. In an alternative embodiment, the recesses apparent in FIGS. 3 and 4 may be omitted so that the outer surface 58 of the rotor assembly 30 is smooth and unbroken, and the magnetic poles 44 may be secured to the smooth outer surface 58.

In alternative embodiments, the permanent magnetic material in the permanent magnets 54 may be a ceramic or ferrite material, or alnico. However, rare earth alloys are preferred for the permanent magnets 54 because of a comparatively higher remanence ($B_r$) that is related to magnetic field strength, a comparatively higher coercivity ($H_{ci}$) that gauges resistance to demagnetization, and a comparatively higher energy product ($BH_{max}$) that is related to energy density.

The permanent magnets 54 are illustrated as having the shape of rectangular blocks that, if multiple permanent magnets 54 are present in each magnetic pole 44, have an end-to-end arrangement. However, each permanent magnet 54 is not constrained to have a rectangular block shape. The permanent magnets 54 also have a slight curvature to conform to the shape of the outer surface of the rotor frame 42.

Figure 4A:
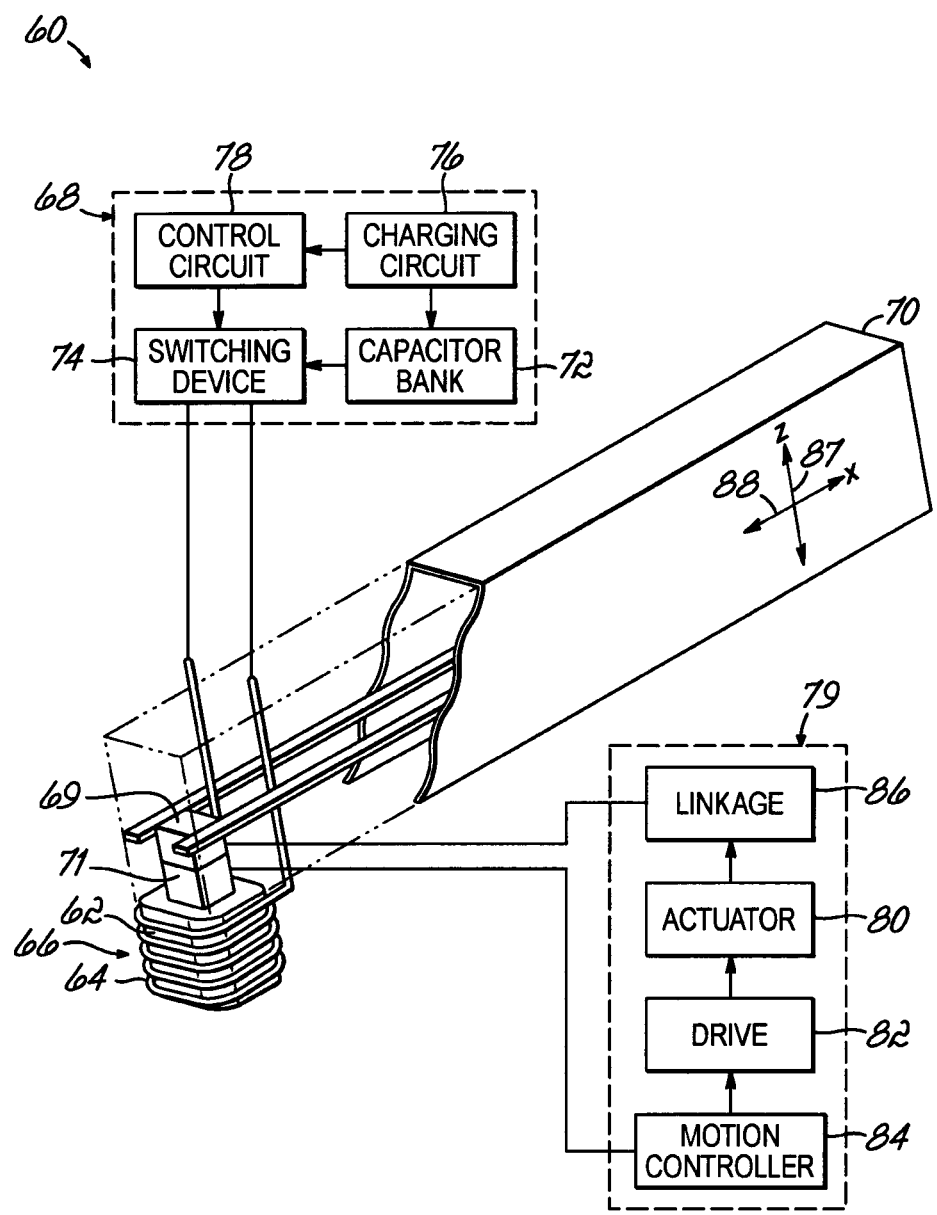
FIG. 4A is a diagrammatic view of the magnetization system including the magnetizing fixture of FIGS. 3 and 4.

With reference to FIGS. 3, 4, and 4A, the generator 20 further includes a magnetization system, generally indicated by reference numeral 60, that is operative to magnetize the magnetic material constituting the permanent magnets 54 of the magnetic poles 44. The magnetization system 60 includes a head 62, a coil 64 having plural turns wrapped about the head 62 to collectively define a magnetizing fixture 66, a driving circuit 68 electrically connected with the coil 64 of the magnetizing fixture 66, a positioner 70 to which the head 62 is coupled for motion relative to the stator assembly 28 and rotor assembly 30, and a motion control system 79 coupled with a movable portion 69 of the positioner 70. The magnetizing fixture 66 and the positioner 70, which are stationed in the stator assembly 28, define a permanent portion of the stator assembly 28 that remains installed in the stator assembly 28 when the generator 20 is operating.

The magnetizing fixture 66 and positioner 70 are supported within the stator assembly 28. In the representative embodiment, the magnetizing fixture 66 is supported inside a slot 41 of the stator frame 38 by the positioner 70 and may replace one of the coils 40 of the stator assembly 28. The head 62 may be composed of a ferromagnetic material, such as a steel alloy, that strengthens the magnetic field produced by a current flowing through the coil 64. The turns of the coil 64 are composed of an electrical conductor and are separated from one another and from the head 62 by an insulator (not shown), such as air gaps and/or a solid dielectric material like varnish or an insulating tape. The turns of the coil 64 may be helically wrapped about the head 62 in a solenoidal fashion.

The magnetization system 60 generates a strong or high intensity magnetic field of short duration that is used to magnetize the magnetic material in the permanent magnets 54 of the magnetic poles 44. The magnetization system 60 generates the magnetic field by causing a transient high current pulse to be directed from the driving circuit 68 through the turns of the coil 64 of magnetizing fixture 66. The discrete magnetic fields generated by the individual turns of the coil 64 constructively add to yield the total magnetic field emanating from the magnetizing fixture 66 when the coil 64 is energized. The field lines of the magnetic field are concentrated along the centerline of the coil 64. The magnetic field generated by the coil 64 generally scales with increasing current level of the current pulse and with the number of turns in the coil 64.

The magnetic field generated by the magnetizing fixture 66 interacts with a volume of magnetic material in each permanent magnet 54 and aligns the magnetic domains within the volume. After the external magnetic field collapses, the magnetic material in the magnetized volume remains aligned and thereby permanently magnetized. The current may be directed through the turns of the coil 64 in, for example, a clockwise direction to magnetize the magnetic material with a first polarization vector and directed through the turns of the coil 64 in an opposite counterclockwise direction to magnetize the magnetic material with a first polarization vector that differs in direction from the first polarization vector. In one embodiment, the current supplied to the coil 64 may be on the order of hundreds to thousands of amperes and the magnetic field generated by the magnetization system 60 may exceed 40,000 Gauss (4 Tesla).

In one embodiment, the driving circuit 68 includes a bank of capacitors 72, a switching device 74 connecting the capacitor bank 72 with the leads of the coil 64, a charging circuit 76 configured to charge the capacitor bank 72, and a control circuit 78. The control circuit 78 is configured to activate the charging circuit 76 to charge the capacitor bank 72 and is also configured to actuate the switching device 74 to abruptly discharge the stored charge from capacitor bank 72 as a transient high-voltage direct current pulse through the coil 64. The switching device 74 may be, for example, a silicon controlled rectifier. The stored charge released from the capacitor bank 72 generates the direct current pulse in the turns of the coil 64, which in turn generates the relatively strong magnetic field of short duration (typically a few milliseconds) used to magnetize each magnetic pole 44. As the direct current pulse in the coil 64 dissipates, the external magnetic field collapses. The control circuit 78 can cause the capacitor bank 72 and switching device 74 to output direct current pulses to the coil 64 with current flow in either a clockwise direction or a counter clockwise direction to produce a magnetic field of two different polarities according to Faraday's Law. In an alternative embodiment, the charging circuit 76 may be a different type of circuit capable of producing a signal having a current level and a rate change of current adequate to generate the requisite direct current pulses.

A surface 63 of the head 62 confronts the rotor assembly 30 and, in particular, confronts a surface 45 of the magnetic pole 44 that is across the radial air gap 52 from the head 62. The head 62 and coil 64 have a footprint within the stator assembly 28 that is significantly smaller than the footprint of each set of coils 40 and each of the teeth 48 and slots like slot 41 that extend along the full length, L, of the stator frame 38.

The positioner 70, which may be a stage or slide, consists of a mechanical system with various mechanical elements that cooperate to support the magnetizing fixture 66 and to provide the motion of the magnetizing fixture 66 along the length, L, of each magnetic pole 44. In one embodiment, the positioner 70 may be configured to provide linear motion by moving the magnetizing fixture 66 in a linear path along the length, L, of each magnetic pole 44.

The movable portion 69 of the positioner 70 is mechanically coupled with and supports the magnetizing fixture 66. The motion control system 79 includes an actuator 80, a drive 82, and a motion controller 84. The actuator 80, which may be a stepper motor or a servo in representative embodiments, is connected by a mechanical linkage 86 with the movable portion 69 of the positioner 70. The mechanical linkage 86 may include gears, shafts, a lead screw, a ball screw, belts, bearings, or other structures recognized by a person having ordinary skill in the art needed to physically connect the output of the actuator 80 with the movable portion 69 of the positioner 70 and to convert the output of the actuator 80 into motion of the movable portion 69.

The positioner 70 further includes a z-axis stage 71 that is configured to move the magnetizing fixture 66 relative to the confronting surface 45 of the particular magnetic pole 44 that is aligned with the magnetic fixture 68. The z-axis stage 71 is configured to change the separation between the surface 45 of the magnetic pole 44 and the surface 63 of the head 62 of magnetizing fixture 66 by moving the magnetizing fixture 66 in a radial direction relative to longitudinal axis 49. For example, the z-axis stage 71 can move the magnetizing fixture 66 to reduce the separation between the magnetic pole 44 and magnetizing fixture 66 when magnetizing or demagnetizing the magnetic pole 44 and then retract the magnetizing fixture 66 to a location within the generator 20 that does not alter the magnetic fields during generator operation. The z-axis stage 71 of the positioner 70 may be used to place the magnetizing fixture 66 in a contacting relationship with the magnetic pole 44 during a magnetizing or demagnetizing procedure.

In an alternative embodiment, the z-axis stage 71 may be omitted from the construction of the positioner 70 so that the magnetizing fixture 68 is not movable in the radial direction.

The motion controller 84 includes digital circuitry and/or analog circuitry that is interfaced with the drive 82, which accepts commands from the motion controller 84 and generates the control signals required to drive the actuator 80 and required to cause movement of the z-axis stage 71. The motion controller 84 may include a programmable logic controller (PLC) or another type of microprocessor-based controller with at least one central processing unit capable of executing application software stored in a memory. The motion controller 84 executes application software to generate a trajectory based upon assigned target positions and motion profiles for the movable portion 69 of the positioner 70. The motion controller 84 supplies control signals reflecting the trajectory to the drive 82, which generates drive signals that control the operation of the actuator 80 and predictably move the positioner 70 to locate the magnetizing fixture 66 to the various positions needed to magnetize each magnetic pole 44. In one embodiment, the drive 82 may be a power amplifier that boosts the voltage/current of the control signal to provide drive signals with a power adequate to operate a servo or stepping motor representing the actuator 80. In one embodiment, the motion controller 84 may rely on open loop control. The motion controller 84 may also optionally receive positional and/or velocity data from one or more feedback sensors (not shown) and use the positional and/or velocity data in a closed control loop using a proportional-integral-derivative (PID) control algorithm so that, for example, a motor shaft of the actuator 80 is rotated in a controlled manner.

To access all of the magnetic poles 44, the rotor assembly 30 is rotated about the longitudinal axis 49 to locate each of the magnetic poles 44 at a stationary circumferential position such that the magnetizing fixture 66 is directly across the radial air gap 52 from the respective magnetic pole 44. The rotation of the rotor assembly 30 to sequentially relocate the magnetic poles 44 can be performed manually or may be executed automatically by causing the drive shaft 46 to turn. The positioner 70 may then be used to move the magnetizing fixture 66 to various prescribed locations relative to the particular magnetic pole 44 that is aligned with the magnetizing fixture 66. The z-axis stage 71 is optionally used to change the radial position of the head 62 of magnetizing fixture 66 relative to the magnetic pole 44 to establish a radial separation between the surfaces 45, 63. In the representative embodiment, the movable portion 69 of the positioner 70 and the magnetizing fixture 66 are movable in a direction aligned with a first motion axis 88 that is aligned generally parallel with the longitudinal axis 49 and the magnetizing fixture 66 is moveable relative to the moveable portion 69 in a direction aligned with a second motion axis 87 transverse to the motion axis 88 and radial relative to the longitudinal axis 49. The first motion axis 88 is also aligned generally parallel with the length, L, of the magnetic poles 44.

Figure 5:
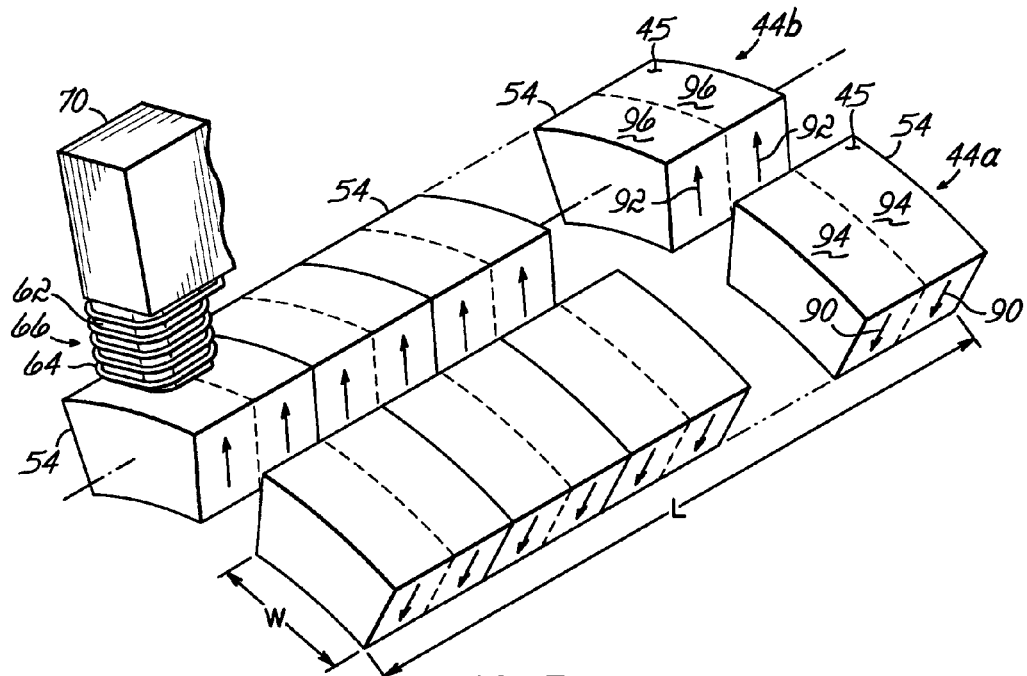
FIG. 5 is a perspective view of the magnetizing fixture of the magnetization system of FIGS. 3, 4, and 4A and two representative magnetic poles of the generator in which the permanent magnets of each representative magnetic pole have been magnetized using the magnetization system in an axial pattern.

The magnetic poles 44 are initially installed in the rotor assembly 30 with the permanent magnets 54 in a non-magnetized condition. After installation and before operation of the generator 20, the magnetization system 60 is used to magnetize the permanent magnets 54 of each magnetic pole 44. In particular and as shown in FIG. 5, the permanent magnets 54 in one of the magnetic poles 44, in particular a first magnetic pole 44a, are magnetized with a first polarization vector as indicated on FIG. 5 by a single headed arrow 90. The permanent magnets 54 in another of the magnetic poles 44, in particular a second magnetic pole 44b adjacent to magnetic pole 44a, are magnetized with a second polarization vector as indicated on FIG. 5 by a single headed arrow 92. Polarization vector 90 has a radially inward direction relative to the longitudinal axis 49 and polarization vector 92 has a radially outward direction relative to longitudinal axis 49. The pattern of magnetization of magnetic poles 44a, 44b is repeated for all of the magnetic poles 44.

Generator 20, as used herein, is any dynamic device configured to convert mechanical energy from a prime mover and output electrical energy. Although illustrated for use with generator 20 in the representative embodiment, a person having ordinary skill in the art will appreciate that the magnetization system 60 may be used in any suitable type of electrical machine that converts mechanical energy to electrical energy or vice versa, and/or that changes an alternative current voltage from one level to another level.

In use, the generator 20 is installed in the wind turbine 10 during the ordinary course of the assembly of the wind turbine 10 and is optionally coupled with the drive shaft 32 before magnetization is performed. At the time of the installation, the magnetic poles 44 in the generator 20 are in a non-magnetized state, which simplifies the assembly of the generator 20. The rotor assembly 30 of the generator 20 is rotated about the longitudinal axis 49 such that one of the magnetic poles 44, in this instance the representative magnetic pole 44a, is circumferentially aligned with the magnetizing fixture 66. The motion control system 79 is operated to move the movable portion 69 of the positioner 70 in a direction parallel with the first motion axis 88 such that the magnetizing fixture 66 is located at a first position relative to the aligned magnetic pole 44a. Specifically, the motion controller 84 supplies control signals to the drive 82, which generates drive signals that cause the actuator 80 to provide powered motion of the movable portion 69 of the positioner 70 to locate the magnetizing fixture 66 at the first position. The motion control system 79 is optionally operated to cause the z-axis stage 71 to move the magnetizing fixture 66 in a direction aligned with the second motion axis 87 for establishing a suitable radial separation between the surfaces 45, 63.

The driving circuit 68 is then used to magnetize the permanent magnets 54 constituting the pole 44a. The control circuit 78 of driving circuit 68 is operated to activate the charging circuit 76 to charge the capacitor bank 72. When sufficiently charged, the control circuit 78 actuates the switching device 74 of driving circuit 68 to abruptly discharge the stored charge from capacitor bank 72 as a first current pulse through the coil 64 in a, for example, clockwise direction. The passage of the first current pulse through the coil 64 generates a magnetic field. The external magnetic field magnetizes a magnetic domain 94 of the magnetic material in the magnetic pole 44a with the majority of the individual atomic magnetic moments aligned with polarization vector 90. The resultant magnetization of the magnetic domain 94 is primarily aligned with the polarization vector 90. In one embodiment, the rotor assembly 30 is held in a static condition and the magnetizing fixture 66 is held stationary at the first position during the magnetization.

The strength of the magnetic field is concentrated along the centerline of the coil 64 and is relatively weak outside of the coil 64. Because the magnetizing fixture 66 is dimensionally smaller than the magnetic pole 44a and the other magnetic poles 44, a single current pulse through the coil 64 is incapable of generating a magnetic field sufficient to magnetize the entire magnetic pole 44a. As a result, the size of the magnetic domain 94 is less than or equal to one half of the exterior dimensions of the magnetic pole 44a, which is given by the product of the thickness, T, length, L, and width, W.

The mobility of the magnetizing fixture 66 attributable to the motion control system 79 and the positioner 70 permits all or part of the magnetic material in the magnetic pole 44*a* to be magnetized with the polarization vector 90. Under the direction of the motion control system 79, the positioner 70 is operated to move the magnetizing fixture 66 in a direction aligned with the first motion axis 88 to a second position relative to the aligned magnetic pole 44*a*. Before movement from the first position to the second position and if needed, the motion control system 79 may be operated to cause the z-axis stage 71 to move the magnetizing fixture 66 in a direction aligned with the second motion axis 87 for increasing the radial separation between the confronting surfaces 45, 63. When located in the second position, the motion control system 79 may be optionally operated to cause the z-axis stage 71 to move the magnetizing fixture 66 in a direction aligned with the second motion axis 87 and establish a suitable radial separation between the confronting surfaces 45, 63.

While the magnetizing fixture 66 is preferably held stationary at the second position, the driving circuit 68 is then used, as described above, to send a second high current pulse through the coil 64 in the same direction as the first high current pulse and with roughly the same currently level as the first high current pulse. The field directions of the external magnetic fields resulting from the first and second current pulses through the coil 64 are identical. The external magnetic field magnetizes another magnetic domain 94 of the magnetic material in magnetic pole 44*a* with a magnetization primarily aligned with a polarization vector 90. Consequently, the permanent magnetic field collectively generated by the magnetic domains 94 is aligned with the polarization vector 90.

The motion control system 79 is used to operate the positioner 70 to serially move the magnetizing fixture 66 in a direction aligned with the first motion axis 88 and relative to the aligned magnetic pole 44*a* to additional positions spaced aligned with the length, L, of the aligned magnetic pole 44*a*. If needed, motion control system 79 is used to set the radial separation between the surfaces 45, 63 at each additional position by operating the z-axis stage 71 to move the magnetizing fixture 66 in a direction aligned with the second motion axis 87. The positions of the magnetizing fixture 66 are connected by a linear trajectory due to the constraint imposed by the linear motion of the movable portion 69 of the positioner 70 in the direction aligned with the first motion axis 88.

At each additional position, the magnetizing fixture 66 and the driving circuit 68 of the magnetization system 60 are used to magnetize an additional magnetic domain 94. The dimensions of each magnetic domain 94 is less than or equal to one half of the exterior dimensions of the magnetic pole 44*a*. Eventually, the magnetic material over all or part of the volume of the magnetic pole 44*a* includes magnetic domains 94 having a field direction oriented with polarization vector 90. The distance between the first and second positions of the magnetizing fixture 66, and between the separation between successive positions of the magnetizing fixture 66, may be selected such that the magnetic domains 94 formed by the different current pulses merge in the final magnetized condition of the magnetic pole 44*a* and substantially all of the magnetic material in the magnetic pole 44*a* is in a magnetized state characterized by polarization vector 90.

The rotor assembly 30 of the generator 20 is then rotated about the longitudinal axis 49 such that another of the magnetic poles 44, in this instance the representative magnetic pole 44*b*, is aligned with the magnetizing fixture 66. The representative magnetic poles 44*a*, 44*b* are circumferentially adjacent to each other on the rotor frame 42. The magnetization process described above is repeated to magnetize magnetic domains 96 in the aligned magnetic pole 44*b*. The positioner 70 under the command of the motion control system 79 serially moves the magnetizing fixture 66 in a direction aligned with the first motion axis 88 at plural positions in a linear trajectory aligned with the length, L, of the magnetic pole 44*b* and optionally moves the magnetizing fixture 66 in a direction aligned with the second motion axis 87 to set the radial separation between the surfaces 45, 63. At each position, the driving circuit 68 is operated to send a high current pulse through the coil 64 of the magnetizing fixture 66 with a current direction that is opposite (i.e., counterclockwise) to the direction of current flow for the high current pulses used to magnetize the magnetic domains 94 in magnetic pole 44*a*. Each current pulse generates an external magnetic field with a field direction and field strength effective to magnetize the magnetic material of the magnetic pole 44*b* to form one of the magnetic domains 96 characterized by the polarization vector 92.

The motion control system 79 is used to operate the positioner 70 to serially move the magnetizing fixture 66 in a direction aligned with the first motion axis 88 relative to the aligned magnetic pole 44*b* to additional positions spaced along the length, L, of the aligned magnetic pole 44*b* and, if needed, to operate the z-axis stage 71 of the positioner 70 to move the magnetizing fixture 66 in the radial direction to set the radial separation between the surfaces 45, 63. The positions of the magnetizing fixture 66 are connected by a linear trajectory due to the constraint imposed by the linear motion of the movable portion 69 of the positioner 70. At each position, the magnetizing fixture 66 and the driving circuit 68 of magnetization system 60 are used to magnetize additional magnetic domains 96. The dimensions of each magnetic domain 96 is less than or equal to one half of the exterior dimensions of the magnetic pole 44*b*. Eventually, the magnetic material of the magnetic pole 44*b* and, preferable, the entire volume of the magnetic pole 44*b* includes magnetic domains 96 having a field direction oriented with polarization vector 92. The distance between the first and second positions of the magnetizing fixture 66, and the separation between successive positions of the magnetizing fixture 66, may be selected such that the magnetic domains 96 formed by the different current pulses merge in the final magnetized condition of the magnetic pole 44*b* and substantially all of the magnetic material in the magnetic pole 44*b* is in a magnetized state characterized by polarization vector 92.

The magnetization process, as described above, is repeated to systematically magnetize all of the magnetic poles 44 with one or the other of the different polarization vectors 90, 92. Each magnetic pole 44 containing magnetic material magnetized with the polarization vector 90 is disposed circumferentially between a pair of magnetic poles 44 containing magnetic material magnetized with the polarization vector 92. Likewise, each magnetic pole 44 containing magnetic material magnetized with the polarization vector 92 is disposed circumferentially between a pair of magnetic poles 44 containing magnetic material magnetized with the polarization vector 90.

The magnetization direction of each permanent magnet 54 is through the slab thickness, T, and in a radial direction perpendicular to the longitudinal axis 49 about which the rotor assembly 30 spins or rotates during the normal operation of the wind turbine 10 and generator 20. The number of magnetic poles 44 in the rotor assembly 30 that are magnetized with polarization vector 90 may be equal to the number of magnetic poles 44 magnetized with polarization vector 92.

Placement of the magnetization system 60 as an integral element into the generator 20 increases feasibility and flexibility during the construction and installation of large permanent magnet generators for use in wind turbines. The costs of producing the generator 20, installing the generator 20 in the nacelle 14 of the wind turbine 10, and post-installation servicing of the generator 20 are reduced. In this regard, conventional generator designs are extremely difficult to assemble and disassemble because of the high field strengths of the permanent magnets 54. The embodiments of the invention permit non-magnetized permanent magnets 54 to be assembled into the generator 20 and then magnetized after the generator 20 is mounted inside the nacelle 14 and installed. This simplifies the assembly and disassembly of the generator 20. If not coupled with the drive shaft 32 before magnetization is performed, the generator 20 is postioned inside the nacelle 14 and ready for coupling with the drive shaft 32 after the magnetization procedure is performed.

The magnetization system 60 can be used to restore the original field strength of magnetic poles 44 that may have experienced a loss of field strength. For example, the field strength of the magnetic material may degrade with service life of the wind turbine generator 20 or may be degraded by an acute event such as a short circuit or excessive operating temperature. This ability to revive or refresh degraded magnetic poles 44 also widens the selection of magnetic materials in the permanent magnets 54. In particular, a lower grade of rare earth magnetic material may be utilized in the permanent magnets 54, which may reduce the contribution of the cost of the permanent magnets 54 to the overall cost of the generator 20.

The magnetization system 60 is able to magnetize the magnetic material in each of the magnetic poles 44 to form magnetic domains 94, 96 while the rotor assembly 30 of the generator 20 remains in direct connection with the rotor 16 or the rotor assembly 30 of the generator 20 remains connected by the gearbox 34 with the rotor 16.

Figure 6:
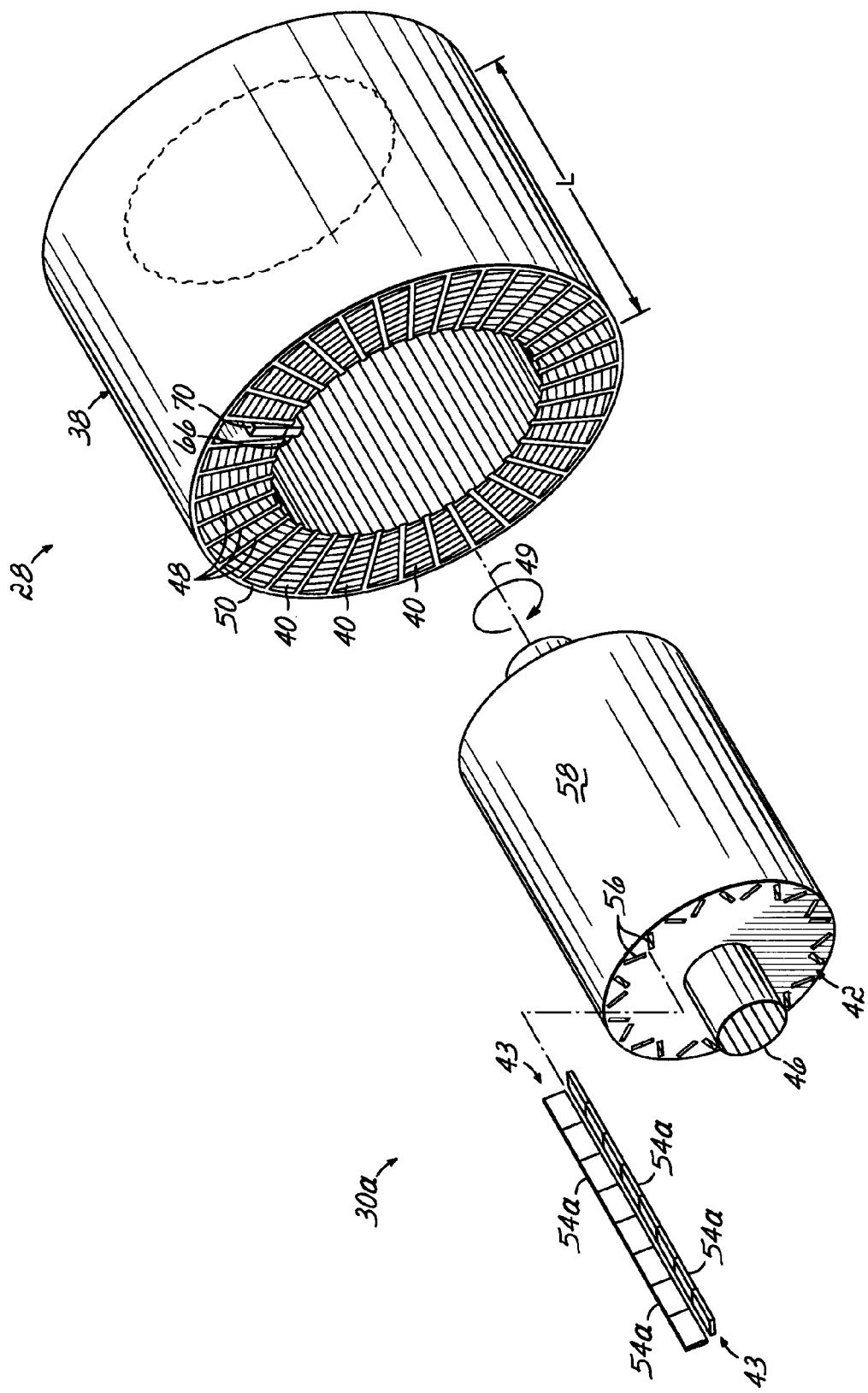
FIG. 6 is an exploded perspective view similar to FIG. 4 of the rotor and stator assemblies of a generator and a portion of a magnetization system in accordance with an alternative embodiment of the invention.

With reference to FIG. 6 and in accordance with an alternative embodiment of the invention, the magnetization system 60 may be provided in a generator that has an interior permanent magnet (IPM) design, as opposed to the surface permanent magnet (SPM) design of generator 20 (FIGS. 3, 4). The rotor assembly 30a of this alternative generator includes a plurality of cavities or slots 56 defined in the rotor frame 42 and a plurality of magnetic poles 43 that are installed into the slots 56 such that a portion of the material of the rotor frame 42 is disposed between each magnetic pole 43. Otherwise, the construction of the rotor assembly 30a is similar to rotor assembly 30. Each of the magnetic poles 43 includes one or more permanent magnets 54a similar to the permanent magnets 54 of magnetic poles 44. When installed in the slots 56, the magnetic poles 43 are embedded inside the rotor frame 42 and displaced radially inward from the outer surface 41. The generator of the embodiment of FIG. 6 is illustrated as incorporating the same stator assembly 28 as generator 20, although the invention is not so limited. The magnetization system 60 may be used to magnetize and demagnetize the permanent magnets 54a of the poles 43 in the various embodiments described herein.

Figure 7:
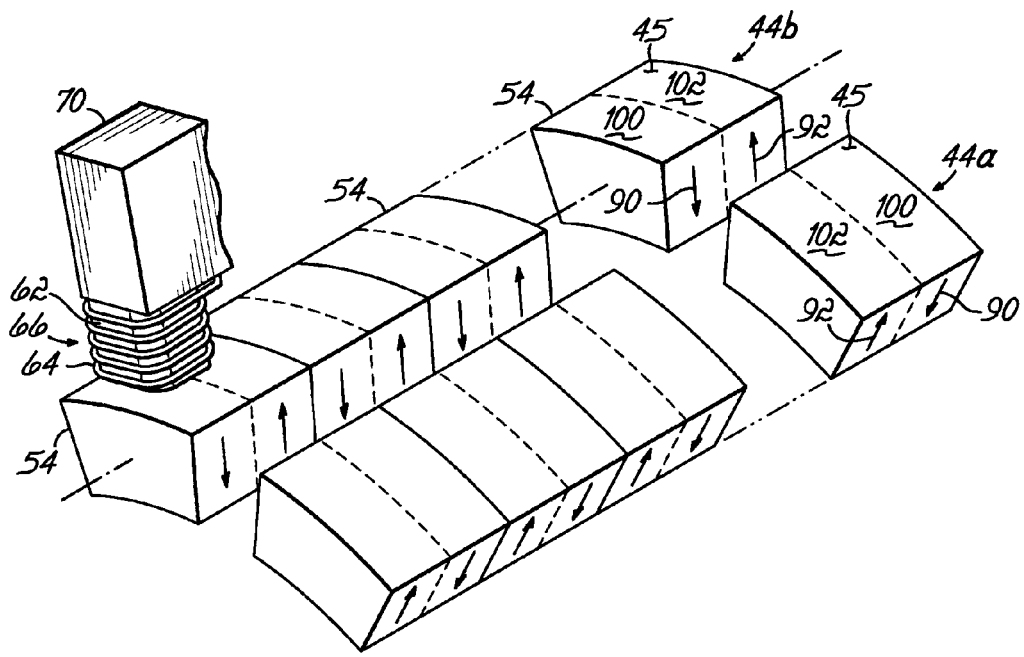
FIG. 7 is a perspective view similar to FIG. 5 in which the permanent magnets of each magnetic pole have been effectively demagnetized using the magnetization system of FIG. 5 such that different domains of each magnetic pole have alternating magnetic polarizations.

With reference to FIG. 7 and in accordance with an embodiment of the invention, the magnetization system 60 can be used to modify the magnetic domains of the magnetic poles 44 to effectively demagnetize the magnetic poles 44 and promote disassembly of the generator 20 to, for example, perform service or maintenance. To that end, the magnetization system 60 may be used to form alternating magnetic domains 100, 102 of different (e.g., opposite) magnetic polarization. The magnetic fields generated by the magnetic domains 100, 102 superimpose such that the net magnetic field is effectively nulled at a short distance from each magnetic pole 44. The modified magnetic poles 44 are thereby placed in a state in which the net magnetic is near zero at a short distance away from the magnetic poles 44. Specifically, the magnetic field strengths and the dimensions of the magnetic domains 100, 102 are selected such that the net magnetic field at a short distance from each of the magnetic poles 44 is negligible. The nullification of the magnetic field dramatically reduces the forces that would otherwise hinder disassembly while the generator 20 remains installed in the wind turbine 10.

To initiate service or maintenance, the rotor assembly 30 of the generator 20 is rotated about the longitudinal axis 49 such that one of the magnetic poles 44, for example magnetic pole 44a, is aligned with the magnetizing fixture 66. Under the control of the motion control system 79, the positioner 70 is operated to move the magnetizing fixture 66 in a direction aligned with the first motion axis 88 to an initial position relative to the aligned magnetic pole 44a. Specifically, the motion controller 84 supplies control signals to the drive 82, which generates drive signals that cause the actuator 80 to provide powered motion of the positioner 70. The first position is calculated as a location suitable for forming one of the magnetic domains 102. If needed, the z-axis stage 71 is operated to establish a radial separation between confronting surfaces 45, 63 by moving the magnetizing fixture 66 in a direction aligned with the second motion axis 87.

Preferably while holding the rotor assembly 30 and the magnetizing fixture 66 stationary, the control circuit 78 of the driving circuit 68 is operated to activate the charging circuit 76 to charge the capacitor bank 72. When sufficiently charged, the control circuit 78 actuates the switching device 74 to abruptly discharge the stored charge from capacitor bank 72 as a first current pulse through the coil 64 in a direction opposite to that used to the magnetic domains 94 (FIG. 5) of magnetize pole 44a. The external magnetic field resulting from the first current pulse directed through the coil 64 magnetizes one of the magnetic domains 102 in the magnetic pole 44a. After the external magnetic field collapses, the majority of the individual atomic magnetic moments in the magnetized volume of magnetic material are aligned with polarization vector 92 to form one of the magnetic domains 102. Because of the compact dimensions of the magnetizing fixture 66 in comparison with the exterior dimensions of the magnetic pole 44a, residual magnetic material in the magnetic pole 44a remains magnetized with polarization vector 90. The dimensions of the magnetic material in magnetic domain 102 may be similar to the dimensions of the magnetic material in one of the magnetic domains 94 (FIG. 5) and, in any event, is less than or equal to one half of the exterior dimensions of the magnetic pole 44a.

The magnetization system 60 may then used to form additional magnetic domains 102 in magnetic pole 44a. The motion control system 79 is used to operate the positioner 70 to move the magnetizing fixture 66 from the initial position to at least one additional position relative to the aligned magnetic pole 44a and optionally to set the radial separation between confronting surfaces 45, 63. The driving circuit 68 is then used, as described above, to send a high current pulse through the coil 64 at each additional position. The external magnetic field magnetizes another magnetic domain 102 with polarization vector 92 in the aligned magnetic pole 44*a* at each additional position.

Each adjacent pair of magnetic domains 102 is separated by one of the magnetic domains 100 with the exception of magnetic domains 102 that border an end of the magnetic pole 44*a*. As a result, the magnetic domains 100, 102 spatially alternate along the length, L, of magnetic pole 44*a*. The separation between adjacent positions of the magnetizing fixture 66 when delivering each current pulse to the coil 64 is determined to optimize the demagnetization produced by the opposing magnetic fields of the magnetic domains 100, 102.

The rotor assembly 30 of the generator 20 is then rotated about the longitudinal axis 49 such that another of the magnetic poles 44, in this instance the representative magnetic pole 44*b*, is aligned with the magnetizing fixture 66. Under the control of the motion control system 79, the positioner 70 is operated to move the magnetizing fixture 66 in a direction aligned with the first motion axis 88 to an initial position relative to the aligned magnetic pole 44*b*. Specifically, the motion controller 84 supplies control signals to the drive 82, which generates drive signals that cause the actuator 80 to provide powered motion of the positioner 70. The first position is calculated as a location suitable for forming one of the magnetic domains 100. If needed, the z-axis stage 71 is operated to establish a radial separation between confronting surfaces 45, 63 by moving the magnetizing fixture 66 in a direction aligned with the second motion axis 87.

Preferably while holding the rotor assembly 30 and the magnetizing fixture 66 stationary, the control circuit 78 of the driving circuit 68 is operated to activate the charging circuit 76 to charge the capacitor bank 72. When sufficiently charged, the control circuit 78 actuates the switching device 74 to abruptly discharge the stored charge from capacitor bank 72 as a first current pulse through the coil 64 in a direction opposite to that used to the magnetic domains 96 (FIG. 5) of magnetize pole 44*b*. The external magnetic field resulting from the first current pulse directed through the coil 64 magnetizes one of the magnetic domains 100 in the magnetic pole 44*b*. After the external magnetic field collapses, the majority of the individual atomic magnetic moments in the magnetized volume of magnetic material are aligned with polarization vector 92 to form one of the magnetic domains 100. Because of the compact dimensions of the magnetizing fixture 66 in comparison with the exterior dimensions of the magnetic pole 44*b*, residual magnetic material in the magnetic pole 44*b* remains magnetized with polarization vector 92. The dimensions of the magnetic material in magnetic domain 100 may be similar to the dimensions of the magnetic material in one of the magnetic domains 96 (FIG. 5) and, in any event, is less than or equal to one half of the exterior dimensions of the magnetic pole 44*b*.

The magnetization system 60 may then used to form additional magnetic domains 100 in magnetic pole 44*b*. The motion control system 79 is used to operate the positioner 70 to move the magnetizing fixture 66 from the initial position to at least one additional position relative to the aligned magnetic pole 44*b* and optionally to set the radial separation between confronting surfaces 45, 63. The driving circuit 68 is then used, as described above, to send a high current pulse through the coil 64 at each additional position. The external magnetic field magnetizes another magnetic domain 100 with polarization vector 90 in the aligned magnetic pole 44*b* at each additional position.

Each adjacent pair of magnetic domains 100 is separated by one of the magnetic domains 102 with the exception of magnetic domains 100 that border an end of the magnetic pole 44*b*. As a result, the magnetic domains 100, 102 spatially alternate along the length, L, of magnetic pole 44*b*. The separation between adjacent positions of the magnetizing fixture 66 when delivering each current pulse to the coil 64 is determined to optimize the demagnetization produced by the opposing magnetic fields of the magnetic domains 100, 102.

The process is repeated until magnetic domains 100, 102 of alternating magnetic polarization 90, 92 are formed in each of the magnetic poles 44, including the representative magnetic poles 44*a*, 44*b*. Disassembly of the generator 20 may then proceed with the magnetic poles 44 in a state of significantly reduced net magnetic field. After service or maintenance has been performed, the magnetic domains 100, 102 may be re-magnetized using the magnetization system 60 to restore the magnetic domains 94, 96 (FIG. 5) and the generator 20 returned to service.

Figure 7A:
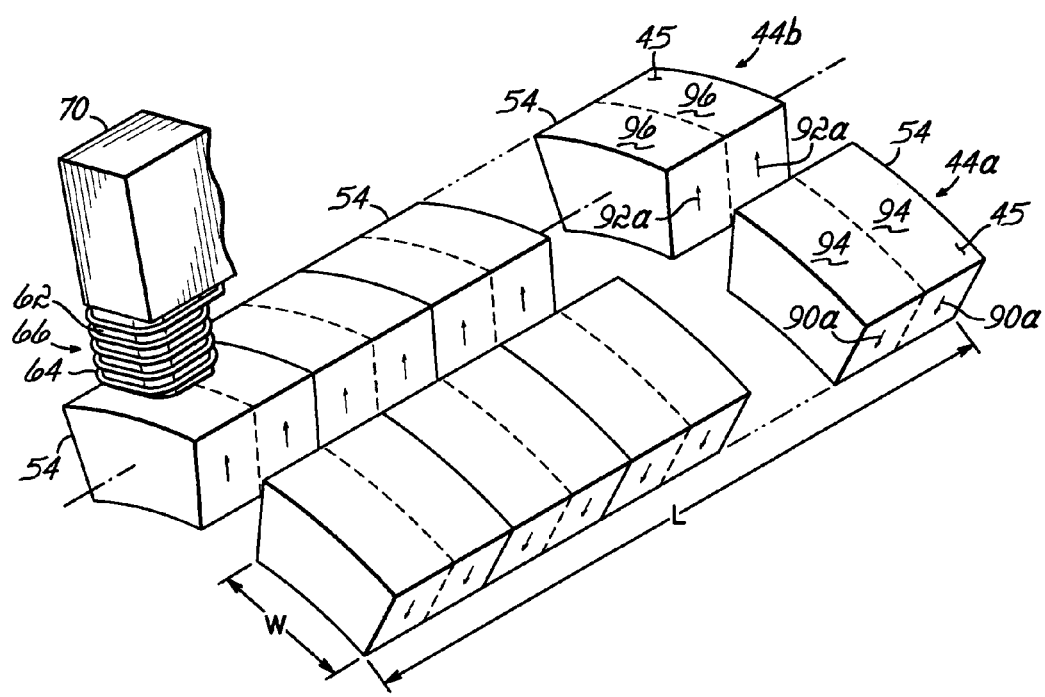
FIG. 7A is a perspective view similar to FIG. 7 in which the permanent magnets of each magnetic pole have been effectively demagnetized using the magnetization system to reduce the field strength of the constituent domains.

With reference to FIG. 7A in which like reference numerals refer to like features in FIG. 5 and in accordance with an alternative embodiment, the magnetization system 60 may be used to effectively demagnetize the magnetic poles 44 by reducing the field strength of the constituent domains 94, 96 while retaining the same respective polarization vectors 90, 92. The reduction in field strength contrasts with the alternative solution described in connection with FIG. 7 in which magnetic fields of opposing direction are established that destructively add to provide the demagnetization.

Figure 7B:
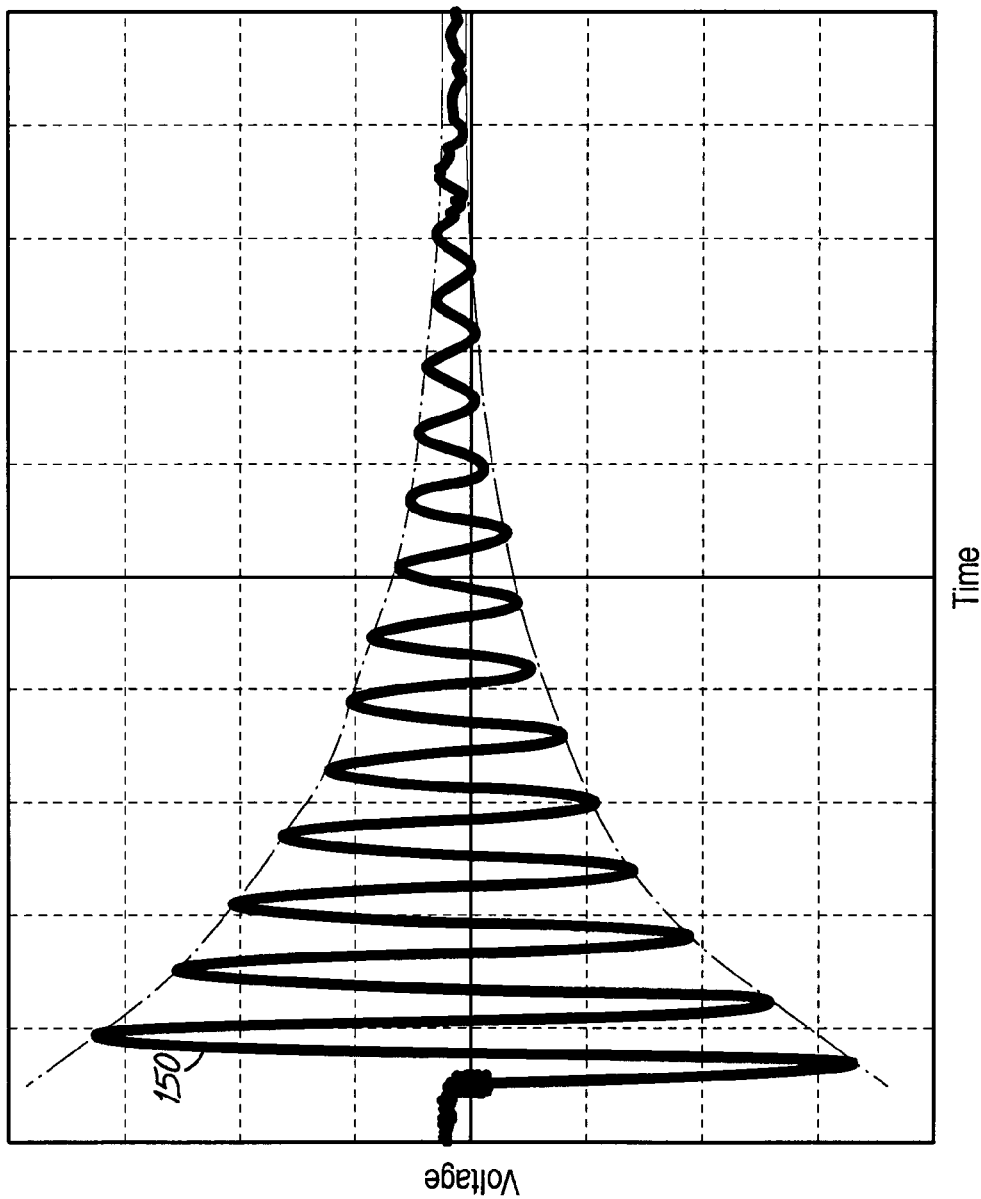
FIG. 7B is a graphical view of an embodiment of a decaying oscillatory waveform that may be employed to provide the demagnetized condition of FIG. 7A.

To demagnetize the magnetic poles 44, the movements applied to the magnetize the magnetic poles 44 described above in connection with the representative magnetic poles 44*a*, 44*b*, are reproduced to position the magnetizing head 66 at the appropriate locations. However, the coil 64 of the magnetizing head 66 magnetization system 60 is energized by the driving circuit with a waveform characterized by an oscillatory or alternating current of decreasing amplitude with accumulated time. In one embodiment as shown by the representative waveform in FIG. 7B, the waveform may be a sinusoidal waveform 150 characterized by a decreasing peak amplitude for the sinusoid that oscillates within an envelope. The characteristics of the waveform are selected to be effective to reduce the field strength to a fraction of the field strength for a magnetized condition suitable for generator operation. Among the selective parameters for the waveform used to demagnetize the magnetic poles 44 are the oscillation frequency, the peak amplitude for the initial cycle, and the dampening rate of the peak amplitude. The significant reduction in field strength effectively demagnetizes the permanent magnets 54 of the magnetic poles 44. In one embodiment, the reduced field strength may be 3 percent or less of the field strength in the magnetized condition (FIG. 7).

Figure 8:
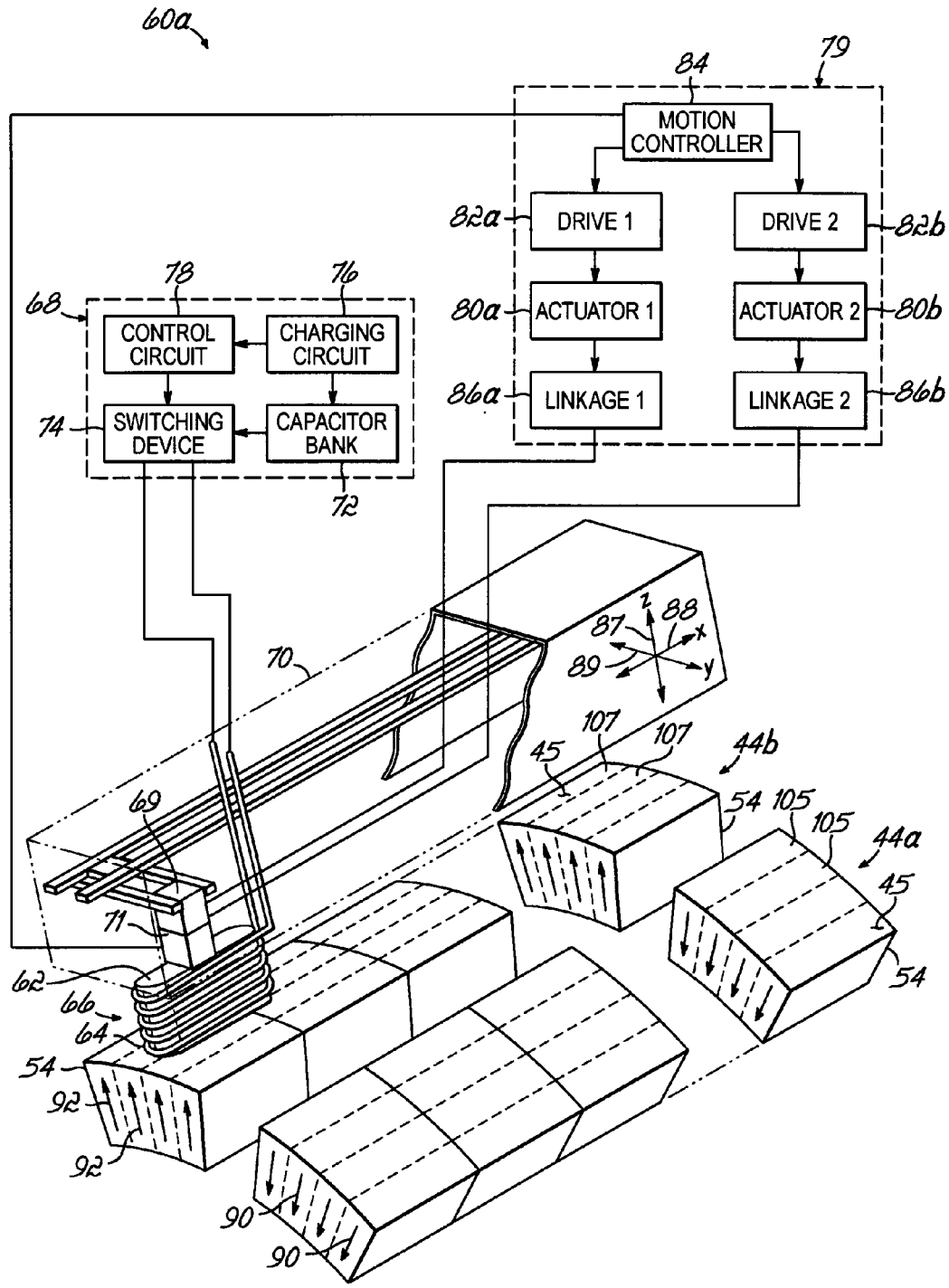
FIG. 8 is a diagrammatic view of a magnetization system in accordance with an alternative embodiment of the invention and in which the permanent magnets of each representative magnetic pole have been magnetized with a circumferential pattern.

With reference to FIG. 8 in which like reference numerals refer to like features in FIGS. 1-7 and in accordance with an alternative embodiment, a magnetization system 60*a* permits multi-axis control over the indexed movement of the movable portion 69 of the positioner 70. To that end, the construction of the movable portion 69 of the positioner 70 is altered to permit movement in a direction aligned with a motion axis 89, as well as independent movement in a direction aligned with motion axis 88. Motion along motion axis 88 is aligned in a direction that is aligned substantially parallel to the longitudinal axis 49. Motion in the direction along motion axis 89 is aligned substantially transverse to a direction parallel to the longitudinal axis 49.

To implement multi-axis control, the motion control system 79 is modified to incorporate a plurality of drives 82*a*, 82*b* each similar in construction and functionality to drive 82, a plurality of actuators 80*a*, 80*b* each similar in construction and functionality to actuator 80, and a plurality of mechanical linkages 86*a*, 86*b* each similar in construction and functionality to mechanical linkage 86. Each of the drives 82*a*, 82*b* interfaces the motion controller 84 with a respective one of the actuators 80*a*, 80*b*. In one embodiment, actuator 80*a* can be driven by drive 82*a* to move the magnetizing fixture 66 in a direction aligned with motion axis 88 and actuator 80*b* can be driven by drive 82*b* to move the magnetizing fixture 66 in a direction aligned with motion axis 89. In the representative embodiment, motion in a direction aligned with motion axis 87 is also available to adjust the radial position of the magnetizing fixture 66.

The movable portion 69 of the positioner 70 and magnetizing fixture 66 can be moved along multiple axes. In the representative embodiment, the movable portion 69 of the positioner 70 and magnetizing fixture 66 are movable with three degrees of freedom also including radial motion in a direction aligned with motion axis 87. In the representative embodiment, motion axis 89 is aligned in a direction parallel to the width, W, of each magnetic pole 44 and motion axis 88 is aligned with the length, L, of each magnetic pole 44. Motion axis 89 is transverse or tangential to the surface 45 of each magnetic pole 44 when aligned with the magnetizing fixture 66. The magnetizing fixture 66 is serially located by motion in respective directions aligned with the motion axes 88, 89 to positions disposed in a predetermined multi-axis trajectory relative to each magnetic pole 44. At each of the positions, the magnetization system 60*a* is operated to magnetize the one or more permanent magnets 54 in each magnetic pole 44 with one or the other of the polarization vectors 90, 92. The resulting magnetization of the magnetic poles 44 is similar to the magnetization shown in FIG. 5 in that magnetic material in magnetic pole 44*a* has magnetic domains 105 that are uniformly magnetized with an alignment along polarization vector 90 and magnetic material in magnetic pole 44*b* has magnetic domains 107 that are uniformly magnetized with an alignment along polarization vector 92.

The size and shape of the magnetizing fixture 66 influences and may be determinative of the spatial dimensions of the magnetic domain formed with each of the current pulses. In this embodiment, the magnetic domains 105, 107 are slices that are arranged about the circumference of each magnetic pole 44. The magnetizing fixture 66 is located by the movable portion 69 of the positioner 70 at positions along a multi-axis trajectory that are distributed or spaced axially parallel to the longitudinal axis 49 of the rotor assembly 30 about which the rotor assembly 30 rotates and that are distributed or spaced circumferentially about the longitudinal axis 49. For example, the magnetizing fixture 66 may be used to magnetize one magnetic domain 105 at a corner of magnetic pole 44*a*, indexed circumferentially in a direction aligned with motion axis 89 to magnetize additional magnetic domains 105 without changing the axial position along motion axis 88, and then indexed axially in a direction aligned with motion axis 88 and circumferentially along motion axis 89, as needed, to additional positions with axial and circumferential coordinates to magnetize additional magnetic domains 105. Similar movements are used to magnetize the remaining magnetic poles 44.

Figure 9:
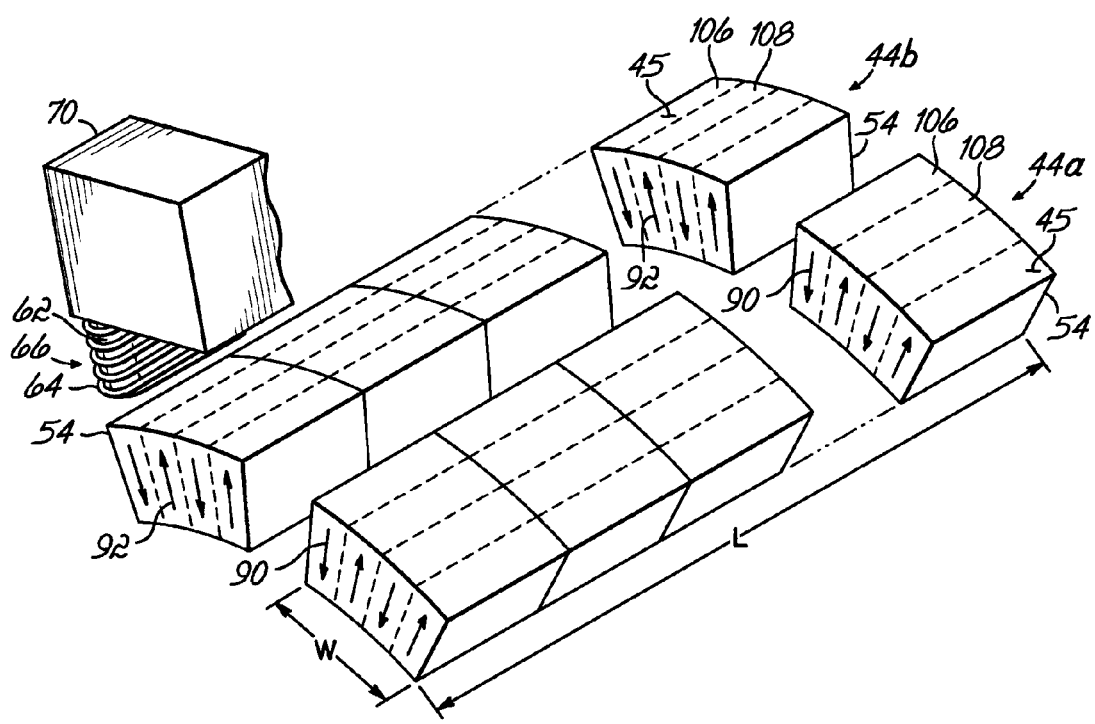
FIG. 9 is a perspective view similar to FIG. 8 in which the permanent magnets of each magnetic pole have been effectively demagnetized using the magnetization system of FIG. 8 such that different domains of each magnetic pole have alternating magnetic polarizations.

With reference to FIG. 9 in which like reference numerals refer to like features in FIG. 8, the magnetization system 60*a* also has the ability to form magnetic domains 106, 108 characterized by different polarization vectors 90, 92, respectively, so that the magnetic poles 44 are substantially demagnetized. The polarization vector alternation for each of the representative magnetic poles 44*a*, 44*b* is apparent in FIG. 9. After the initial positioning of each permanent magnet 54 relative to the magnetizing fixture 66, the rotor assembly 30 is held stationary while magnetization system 60*a* is used to form the magnetic domains 106, 108. The magnetic domains 106, 108 are formed in a pattern as described above in connection with the formation of magnetic domains 100, 102 (FIG. 6).

The size and shape of the magnetizing fixture 66 influences the spatial dimensions of the magnetic domain formed with each of the current pulses. For example, the size and shape of the magnetizing fixture 66 in FIGS. 8 and 9 may be optimized to form the magnetic domains 106, 108 in the representative form of circumferentially-arranged slices of magnetic material in each permanent magnet 54. With the exception of magnetic domains 106, 108 that share a border with the circumferential edges of each permanent magnet 54, each magnetic domain 106 is disposed between a pair of the magnetic domains 108 and, similarly, each magnetic domain 108 is disposed between a pair of the magnetic domains 106.

The magnetic domains 108 formed in magnetic pole 44*a* may have approximately the same volume as the magnetic domains 105 (FIG. 8) and, as a result, the magnetic domains 106 will also have approximately the same volume as the magnetic domains 105. The magnetic domains 106 formed in magnetic pole 44*b* may have approximately the same volume as the magnetic domains 107 (FIG. 8) and, as a result, the magnetic domains 108 will also have approximately the same volume as the magnetic domains 107. The approximately equivalent dimensions contribute to the nullification of the magnetic field in the demagnetized state.

The magnetic fields of the diverse magnetic domains 106, 108 in each magnetic pole 44 superimpose such that the measurable magnetic field at a short distance from each magnetic pole 44 is either negligible or null. As explained above, the nullification of the superimposed magnetic fields promotes disassembly of the generator 20 for service or maintenance by reducing the forces of attraction and repulsion. The combination of the field strengths of the magnetic domains 106, 108 and the dimensions of the magnetic domains 106, 108 supplies the nullification.

Figure 10:
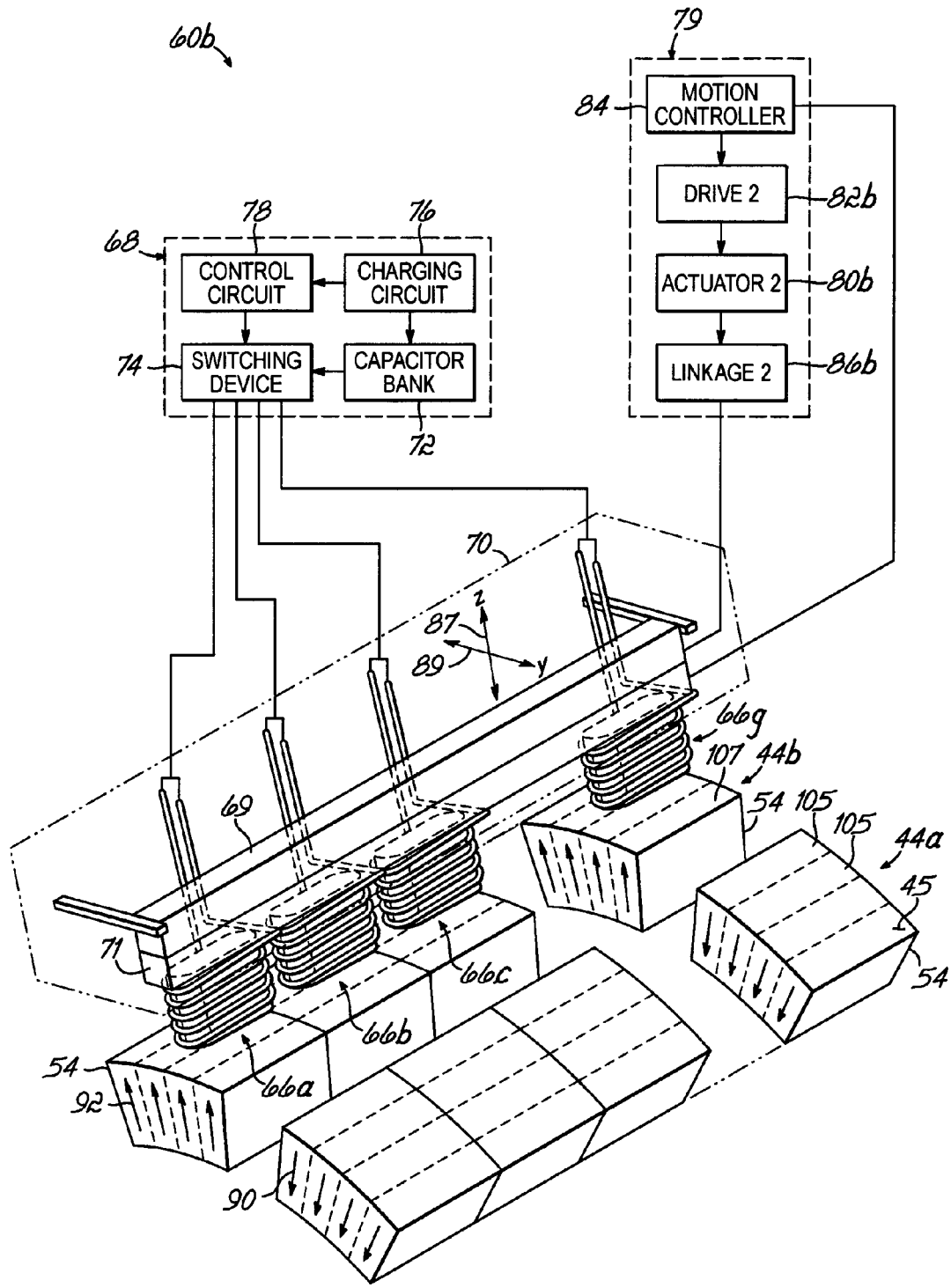
FIG. 10 is a diagrammatic view of a magnetization system in accordance with an alternative embodiment of the invention.

With reference to FIG. 10 in which like reference numerals refer to like features in FIGS. 8 and 9 and in accordance with an alternative embodiment, a magnetization system 60*b* may include multiple magnetizing fixtures, of which multiple magnetizing fixtures 60*a-c* and 60*g* are visible in FIG. 10 and intervening magnetizing fixtures 60*e* and 60*f* are not visible in FIG. 10. Each of the individual magnetizing 60*a-c* and 60*g* is configured like or similar to the embodiment of the magnetizing fixture 60 shown in FIGS. 8 and 9.

The magnetizing fixtures 66*a-c*, 60*g* are supported by the movable portion 69 of the positioner 70. The movable portion 69 of the positioner 70 is configured such that all of the magnetizing fixtures 66*a-c*, 60*g* move as a unit under the direction of the motion control system 79 and the movement is limited to the circumferential direction about the rotor assembly 30. As a result, the magnetizing fixtures 66*a-c*, 60*g* are no longer movable in a direction aligned with the motion axis 88 in this embodiment. The movable portion 69 of the positioner 70 is operated by the motion control system 79 to locate the magnetizing fixtures 66a-c, 60g at indexed positions in a direction aligned with axis 89. In the representative embodiment, the z-axis stage 71 of the positioner 70 may be used to move the magnetizing fixtures 66a-c, 60g in a direction aligned with motion axis 87 for radial position adjustments. The magnetizing fixtures 66a-c, 60g are located by the movable portion 69 of the positioner 70 at positions along a curved trajectory that are spaced circumferentially about the longitudinal axis 49 of the rotor assembly 30 about which the rotor assembly 30 rotates.

The magnetization system 60b is used to form the magnetization patterns for the magnetic poles 44, and in particular, the representative magnetic poles 44a, 44b shown in FIGS. 8 and 9, such that the magnetic poles 44 are magnetized (FIG. 8) or such that the magnetic poles 44 are demagnetized (FIG. 9). In the representative embodiment, the switching device 74 of the driving circuit 68 is coupled through the switching device 74 with each of the magnetizing fixtures 66a-c, 60g. As a result, the coil 64 of only one of the magnetizing fixtures 66a-c, 60g is supplied with a current pulse at any time.

To magnetize, for example, magnetic pole 44a, the driving circuit 68 is used to sequentially supply currents pulses to the coil 64 of each of the magnetizing fixtures 66a-c, 60g in order to magnetize the magnetic domains 105 aligned in a row along the length, L, of the magnetic pole 44a with polarization vector 90. The motion control system 79 is operated to move the movable portion 69 of the positioner 70 circumferentially in a direction aligned with motion axis 89 to locate the magnetizing fixtures 66a-c, 60g at a second position. The magnetization procedure is used to magnetize the magnetic domains 105 aligned in another row along the length, L, of the magnetic pole 44a with polarization vector 90. These two steps are iterated until all or a portion of the magnetic material of magnetic pole 44a is characterized by domains 105 having polarization vector 90. Next, the rotor assembly 30 is indexed so that magnetic pole 44b is aligned with the magnetizing fixtures 66a-c, 60g and the magnetization system 60b is used as described above to magnetize all or a portion of the magnetic material of magnetic pole 44b with domains 107 having polarization vector 92. Additional pairs of magnetic poles 44 are magnetized in a fashion similar to the magnetization of the representative magnetic poles 44a, 44b. The resulting magnetization of the magnetic poles 44 is identical to the magnetization of FIG. 8 in that magnetic material in magnetic pole 44a has magnetic domains 105 that are uniformly magnetized with an alignment along polarization vector 90 and magnetic material in magnetic pole 44b has magnetic domains 107 that are uniformly magnetized with an alignment along polarization vector 92.

The demagnetization pattern of FIG. 9 may also be formed in the representative magnetic poles 44a, 44b, as well as the other magnetic poles 44, that are characterized by domains 106, 108 of different magnetic polarization 90, 92.

In an alternative embodiment, the number of magnetizing fixtures may be reduced to, for example only magnetizing fixtures 66a-c, and the movable portion 69 of the positioner 79 of FIG. 8 may be used to move the multiple magnetizing fixtures 66a-c in a direction aligned with the motion axis 88 for magnetizing the magnetic material along the full length, L, of the magnetic poles 44. The magnetizing fixtures 66a-c, 60g are located by the movable portion 69 of the positioner 70 at positions along a linear trajectory that are spaced axially parallel to the longitudinal axis 49 of the rotor assembly 30 about which the rotor assembly 30 rotates.

In an alternative embodiment, the number of magnetizing fixtures may be reduced to, for example only magnetizing fixtures 66a-c, and the movable portion 69 of the positioner 79 of FIG. 8 may be used to move the multiple magnetizing fixtures 66a-c in respective directions aligned with motion axes 88, 89 for magnetizing the magnetic material along the full length, L, and full width, W, of the magnetic poles 44. The magnetizing fixtures 66a-c, 60g are located by the movable portion 69 of the positioner 70 at positions along a multi-axis trajectory that are spaced axially parallel to the longitudinal axis 49 of the rotor assembly 30 about which the rotor assembly 30 rotates and that are spaced circumferentially about the longitudinal axis 49.

In another alternative embodiment, multiple driving circuits, each nominally like driving circuit 68, may be provided in magnetization system 60b. Each of the driving circuits may be connected with one or more of the magnetizing fixtures 66a-c, 60g, and may be used to magnetize or demagnetize the magnetic poles 44 as described herein.

The principles of the invention may be equally applicable to other types of electrical machines that utilize electromagnetic forces to generate power or electrical machines, such as motors, that convert electrical power into motion. For example, the magnetization systems shown and described herein may be modified to be incorporated into an axial-flux type of generator such that the movements of the head to execute magnetization and demagnetization of the magnetic poles may be performed with a different direction or different directions than described herein. As another example, a different type of prime mover, rather than the rotor of a wind turbine, may be connected with the rotor assembly of the generator.

The ability to re-magnetize the permanent magnets is advantageous. First, the electrical machine need not be designed to accommodate degeneration in the event of a short circuit that would normally partly demagnetize the magnets (maybe even unevenly). Magnets of a lower grade, which are susceptible to demagnetization over time, may be used without need for an initial over-design because the permanent magnets can be return to an initial magnetized state if the strength of the magnetic field deteriorates.

The ability to magnetize the installed permanents magnets means that the electrical machine may be assembled with un-magnetized or partially magnetized magnets for easier assembly and magnet storage. A production line for the electrical machine does not need to handle fully magnetized magnets at any stage of the production.

In an embodiment of the invention, the permanent magnets may be de-magnetized before disassembly of the electrical machine for either service or decommission. The permanent magnets may be demagnetized when opening the machine (i.e., when exchanging bearings) without the need for accurate fixing of the rotor in the air gap as required for a conventional magnetized electrical machine. The permanent magnets or sections of the electrical machine may be replaced with magnets of limited magnetization.

In an embodiment of the invention, the individual magnetization state of the permanent magnets may be controlled and, thus, adjusted to ensure a low variance among the different permanent magnets. The lifetime wear on the permanent magnets can be overcome, which enable lengthier operation without need for replacing the machine or de-rating the system. The magnetization normally takes place in the production of the electrical machine, and the degeneration is accepted as a part of the design.

In an embodiment of the invention, an auxiliary magnetization system is brought to the machine for external magnetization. Normally, once a machine is magnetized, it is not updated, even if the magnets are partially demagnetized due to generator shorts.

If the permanent magnets of an electrical machine are partially demagnetized due to external or internal events (winding shorts or the like) resulting in a lower and maybe non-symmetrical or asymmetrical magnetization, it is possible to restore the initial performance of the electrical machine using the magnetization system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

It will be understood that when an element as a layer, region or substrate is described as being "on" or "over" another element, it can be directly on or over the other element or intervening elements may also be present. In contrast, when an element is described as being "directly on" or "directly over" another element, there are no intervening elements present. When an element is described as being "indirectly on" or "indirectly over" another element, there are intervening elements present. It will also be understood that when an element is described as being "connected" or "coupled" to another element, it can be directly connected or coupled to the other element or intervening elements may be present. In contrast, when an element is described as being "directly connected" or "directly coupled" to another element, there are no intervening elements present. When an element is described as being "indirectly connected" or "indirectly coupled" to another element, there is at least one intervening element present.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for installing an electrical machine, the electrical machine including a stator assembly and a rotor assembly with a plurality of magnetic poles composed of a permanent magnetic material that is in a non-magnetized condition, the method comprising:
    after the electrical machine is installed, individually magnetizing a plurality of magnetic domains in the permanent magnetic material of each of the plurality of magnetic poles,
    wherein individually magnetizing the plurality of magnetic domains in the permanent magnetic material of each of the plurality of magnetic poles comprises:
        magnetizing the magnetic domains in a first number of the plurality of magnetic poles with a first polarization vector; and
        magnetizing the magnetic domains in a second number of the plurality of magnetic poles with a second polarization vector that differs from the first polarization vector.

2. A method for installing an electrical machine, the electrical machine including a stator assembly and a rotor assembly with a plurality of magnetic poles composed of a permanent magnetic material that is in a non-magnetized condition, the method comprising:
    after the electrical machine is installed, individually magnetizing a plurality of magnetic domains in the permanent magnetic material of each of the plurality of magnetic poles,
    wherein individually magnetizing the plurality of magnetic domains in the permanent magnetic material of each of the plurality of magnetic poles comprises:
        serially aligning each of the plurality of magnetic poles relative to a magnetizing fixture;
        when a respective one of the plurality of magnetic poles is aligned with the magnetizing fixture, positioning the magnetizing fixture at a plurality of positions relative to the respective one of the plurality of magnetic poles; and
        at each of the plurality of positions, causing the magnetizing fixture to generate an external magnetic field effective to produce one of the plurality of magnetic domains.

3. The method of claim 2 wherein positioning the magnetizing fixture at the plurality of positions relative to the respective one of the plurality of magnetic poles comprises:
    moving the magnetizing fixture in a single direction along a linear trajectory connecting the plurality of positions.

4. The method of claim 2 wherein causing the magnetizing fixture to generate the external magnetic field effective to produce one of the plurality of magnetic domains comprises:
    passing a current pulse through a coil of the magnetic fixture to produce the external magnetic field.

5. The method of claim 2 wherein positioning the magnetizing fixture at the plurality of positions relative to the respective one of the plurality of magnetic poles comprises:
    moving the magnetizing fixture in a plurality of directions along multi-axis trajectory connecting the plurality of positions.

6. The method of claim 2 wherein serially aligning each of the plurality of magnetic poles with the magnetizing fixture comprises:
    rotating the rotor assembly about a longitudinal axis to serially align each of the plurality of magnetic poles with the magnetizing fixture.

7. The method of claim 2 wherein positioning the magnetizing fixture at the plurality of positions relative to the respective one of the plurality of magnetic poles comprises:
    moving the magnetizing fixture in a direction toward the respective one of the plurality of the magnetic poles or in a direction away from the respective one of the plurality of magnetic poles.

8. The method of claim 7 wherein the direction toward the respective one of the plurality of magnetic poles reduces a separation between the magnetizing fixture and the respective one of the plurality of magnetic poles, and the direction away from the respective one of the plurality of magnetic poles increases the separation between the magnetizing fixture and the respective one of the plurality of magnetic poles.

9. A method for installing an electrical machine, the electrical machine including a stator assembly and a rotor assembly with a plurality of magnetic poles composed of a permanent magnetic material that is in a non-magnetized condition, the method comprising:
   after the electrical machine is installed, individually magnetizing a plurality of magnetic domains in the permanent magnetic material of each of the plurality of magnetic poles,
   wherein individually magnetizing the plurality of magnetic domains in the permanent magnetic material of each of the plurality of magnetic poles comprises:
      serially aligning each of the plurality of magnetic poles relative to a plurality of magnetizing fixtures; and
      when each respective magnetic pole is aligned with the plurality of magnetizing fixtures, causing the magnetizing fixtures to generate respective external magnetic fields effective to produce at least two of the plurality of magnetic domains.

10. The method of claim 9 wherein the at least two magnetic domains are generated with the plurality of magnetizing fixtures located at a first position relative to each respective magnetic pole, and individually magnetizing the plurality of magnetic domains in the permanent magnetic material of each of the plurality of magnetic poles further comprises:
   moving the plurality of magnetizing fixtures to a second position relative to relative to each respective magnetic pole; and
   causing the plurality of magnetizing fixtures to generate respective external magnetic fields effective to produce at least two more of the plurality of magnetic domains.

11. The method of claim 10 wherein the rotor assembly includes a longitudinal axis, the rotor assembly is configured to rotate about the longitudinal axis, and the plurality of magnetizing fixtures are moved along a linear trajectory in a direction aligned with the longitudinal axis from the first position to the second position.

12. The method of claim 10 wherein the rotor assembly includes a longitudinal axis, the rotor assembly is configured to rotate about the longitudinal axis, and the magnetizing fixtures are moved along a multi-axis trajectory in a first direction parallel to the longitudinal axis and in a second direction transverse to the first direction.

* * * * *